US010248982B2

(12) United States Patent
Gonzales, Jr.

(10) Patent No.: US 10,248,982 B2
(45) Date of Patent: Apr. 2, 2019

(54) AUTOMATED EXTRACTION OF PRODUCT DATA FROM PRODUCTION DATA OF VISUAL MEDIA CONTENT

(71) Applicant: eBay Inc., San Jose, CA (US)

(72) Inventor: Sergio Pinzon Gonzales, Jr., San Jose, CA (US)

(73) Assignee: eBay Inc., San Jose, CA (US)

( * ) Notice: Subject to any disclaimer, the term of this patent is extended or adjusted under 35 U.S.C. 154(b) by 550 days.

(21) Appl. No.: 14/580,942

(22) Filed: Dec. 23, 2014

(65) Prior Publication Data

US 2016/0180427 A1 Jun. 23, 2016

(51) Int. Cl.
*G06F 3/00* (2006.01)
*G06Q 30/06* (2012.01)

(52) U.S. Cl.
CPC ..... *G06Q 30/0623* (2013.01); *G06Q 30/0643* (2013.01)

(58) Field of Classification Search
CPC .............. G06F 3/0304; G06Q 30/0623; G06Q 30/0643
USPC ....... 715/716; 725/40; 705/26.1, 26.61, 27.1
See application file for complete search history.

(56) References Cited

U.S. PATENT DOCUMENTS

2003/0005445 A1\* 1/2003 Schein ............... H04N 5/44543
725/51
2011/0067061 A1\* 3/2011 Karaoguz ............. G06F 3/0304
725/40

\* cited by examiner

*Primary Examiner* — Andrey Belousov
(74) *Attorney, Agent, or Firm* — Shook, Hardy & Bacon L.L.P.

(57) ABSTRACT

In various example embodiments, a system and method for automated extraction of product data from production data of visual media content are presented. Production documents are received from a publisher of visual media content. The production documents contain information related to inventory items used in the production of the visual media content. Data, which represents shoppable items, is extracted from the production documents. The extracted data is used to create an index of shoppable items associated with the visual media content. The index includes metadata associated with the shoppable items. User provided data indicating a desired shoppable item from the visual media content is received. The desired shoppable item is identified and item information for the desired shoppable item is produced.

19 Claims, 19 Drawing Sheets

BUDGETING CATEGORIES 230

| ASSET INVENTORY LOG 240 | | | | | | | | | |
|---|---|---|---|---|---|---|---|---|---|
| SPACES | ITEM(S) | PURCHASED PRICE | PURCHASE PURCHASE USE DATE, USE PRICE, P.O.# | DEPARTMENT | AT COMPLETION OF PROJECT, PHOTOGRAPH | # CHECKS IN DATE, USER | # CHECKS OUT DATE, USER | LOCATION OF ITEM | |

| EQUIPMENT RENTAL LOG 241 | | | | | | | |
|---|---|---|---|---|---|---|---|
| ITEMS | VENDOR ADDRESS/PHONE/FAX CONTACT | POS | DISBURSEMENT ADDRESS TO FORWARD $ TO | DATE OF CHECK | LENGTH OF RENTAL | DATE RETURNED | L&D COMPLETE? |
| | | | | | | | |
| | | | | | | | |
| | | | | | | | |
| | | | | | | | |
| | | | | | | | |
| | | | | | | | |
| | | | | | | | |

*FIG. 2F*

BREAKDOWN SHEET 250

SCENE IMAGE 370

TEXT DATA 371 - What is the name of the dance choreographer of this performance?

SCENE IMAGE 375

TEXT DATA 376 - What is the sound equipment used by this band in the video?

SCENE IMAGE 380

RECORDED AUDIO DATA 381 – What camera was used to take this picture?

SCENE IMAGE 390

User Provided Data 391

- IMAGE DATA: Image Scene 390
- AUDIO DATA FROM VISUAL MEDIA CONTENT: actor stated in scene "This martini is the best martini I have ever tasted."
- TEXT DATA: What are the ingredients used to make this martini?

AUTOMATED EXTRACTION OF PRODUCT DATA FROM PRODUCTION DATA OF VISUAL MEDIA CONTENT

TECHNICAL FIELD

Embodiments of the present disclosure relate generally to data processing and, more particularly, but not by way of limitation, to automated extractions of product data from production data of visual media content.

BACKGROUND

Visual media producers may provide commercial transaction opportunities to viewers of the content while a viewer watches the presented media, such as a film, a television (TV) show, a video, or other visual media. Viewers may see products while watching visual media content that they are interested in purchasing or about which they simply want to get more information to help them make a purchasing decision. It many situations, it may be difficult for the viewer to find the product information.

BRIEF DESCRIPTION OF THE DRAWINGS

Various ones of the appended drawings merely illustrate example embodiments of the present disclosure and cannot be considered as limiting its scope.

FIG. 2C illustrates a production cost report used during the production of visual media content, according to one embodiment.

FIG. 2D illustrates examples of budgeting categories used during the production of visual media content, according to one embodiment.

FIG. 2E illustrates an example of an inventory asset used during the production of visual media content, according to one embodiment.

FIG. 2F illustrates an example of an equipment rental used during the production of visual media content, according to one embodiment.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In example embodiments, various documents created during the production of visual media content, such as films and videos, are used to generate an identified set of potential items that a user (or content consumer) may desire to purchase after watching the visual media content. Documentation used by a line producer in visual media productions includes an inventory of all items used during the production of the visual media content. These items, included in the line producer's budget, usually contain precise and accurate descriptions of the budgeted inventory of items. The line producer's budget, along with other production documentation, may be sufficient to automatically extract information about potential items that a user may desire to purchase after watching the visual media content. The potential items may be visible or non-visible items. The extracted information is then used to create an index of items representing a finite group of items used in the production of the visual media content. Object recognition, as well as text recognition and speech recognition, may be used to match an item that the user desires to purchase (or simply gather more information about) with indexed items. Once a match is found, the user may be provided with additional information about the product or service, which may lead to a potential purchase by the user.

Figure 1A:
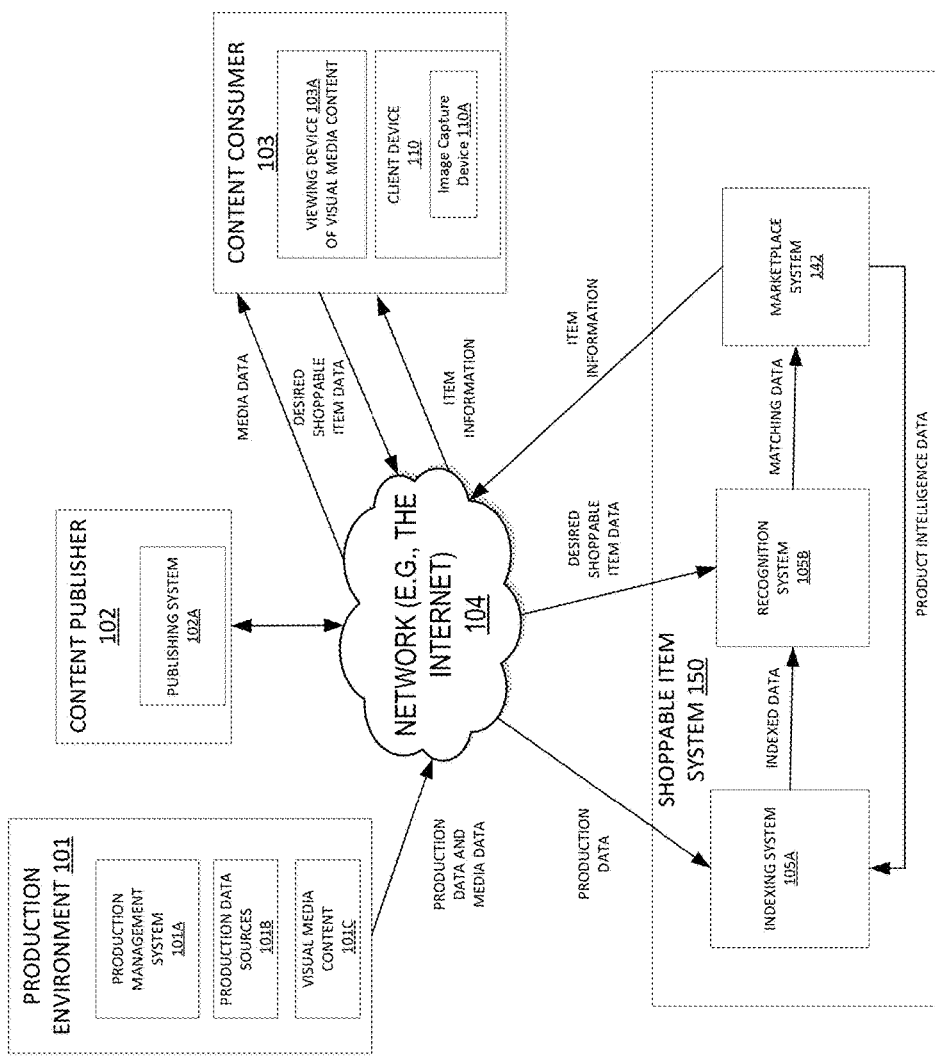
FIG. 1A is a block diagram illustrating a system for producing item information for desired shoppable items seen while viewing visual media content, according to various embodiments.

FIG. 1A illustrates a system that allows users (also referred to as content consumers 103) who view visual media content 101C to identify desired shoppable items within the visual media content 101C that they are interested in. As shown in FIG. 1A, a system 100 includes a production environment 101, content publisher 102, a content consumer 103, and a shoppable item system 150 in communication via a network 104, such as the Internet in example embodiments. The production environment 101 generates the visual media content 101C.

Products and services are collectively referred to as "items." A shoppable item refers to an item that is available for purchase by the content consumer 103. A desired shoppable item refers to a shoppable item that the content consumer 103 has viewed (directly or indirectly) in the visual media content 101C and has a shopping interest in for potential purchase. For example, the content consumer 103 would like to gather item information (i.e., such as product brand, style, model number, pricing information, merchants who sell this item, item availability, item inventory, etc.) to make a purchasing decision regarding the item, or simply gather more information about the item.

The shoppable items may be referred to as visible or non-visible items. Items that can be seen by the content consumer 103 in the visual media content 101C are generally referred to as visible items. Items that cannot be visually identified from the visual media content 101C are referred to as non-visible items. A few examples of non-visible items are hair products used by a hair stylist of a character in a movie, ingredients used to make drinks or food shown in a scene from the visual media content 101C, the sound system used to produce the music in a scene from the visual media content 101C, makeup used on cast members, perfume that created a sweet scent mentioned by a cast member in a scene, and names of various crew members such as hair stylists, makeup artists, and wardrobe designers who worked on the costumes and sets.

The visual media content 101C created within the production environment 101 may be delivered or published to the content consumer 103 via many different media, including, but not limited to, the Internet and TV. The visual media content may include, but is not limited to, films, TV shows, videos, and images. A production management system 101A may be used to manage various aspects of the production of the visual media content 101C such as budgeting, script breakdowns, and scheduling. Once the visual media content 101C is produced, the visual media content 101C may be published by a content publisher 102 by a publishing system 102A. Examples of publishing systems 102A include Hulu Netflix, Amazon Instant Video, Apple's ITunes Video, Comcast, and so forth. The content publisher 102 publishes or distributes content such that the content consumer 103 may view the visual media content 101C using a viewing device 103A. The viewing device may be a TV or computing device (e.g., a client device 110). In some embodiments, the viewing device 103A and the client device 110 are the same device. In alternative embodiments, the content publisher 102 may be integrated within the production environment 101.

The content consumer 103 accesses the visual media content 101C and views the content on the viewing device 103A. While viewing the visual media content 101C or after viewing the visual media content 101C, the content consumer 103 may desire to shop for items that were visually seen (directly or indirectly) from the visual media content 101C or simply gather information about a shoppable item. These items identified by the content consumer 103 are referred to as desired shoppable items. A shoppable item that is visible may be directly seen by the content consumer 103 while viewing the visual media content 101C. A shoppable item that is not seen directly by the content consumer 103, but is associated with an item, cast member, or setting viewed in the visual media content 101C, may be referred to as a non-visible item. Although these shoppable items are not visible to the content consumer 103, they are associated with one or more scenes viewed by the content consumers 103. As such, they may be considered to be indirectly seen by the content consumer 103.

The desired shoppable items selected by the content consumer 103 are used by the shoppable item system 150 to identify the item information of the desired shoppable item. The item information includes information useful to the content consumer 103 in making purchasing decisions regarding the desired shoppable items. The content consumer 103 uses the client device 110 to provide desired shoppable item data (representing the desired shoppable items) to the shoppable item system 150. The client device 110 may include an image capture device 110A for capturing a scene image from the visual media content 101C. In alternative embodiments, the image capture device 110A may be separate from the client device 110 and used to upload the scene image to the client device 110. The desired shoppable item data may represent image data from the scene image, text data, or audio data. The text and audio data may be used for identifying desired shoppable items that are not directly visible to the content consumer 103 from a scene image.

The shoppable item system 150 includes an indexing system 105A, a recognition system 105B, and a marketplace system 142. The indexing system 105A receives production data from the production environment 101. The production data is from production data sources 101B, which refer to any documentation created during the production of the visual media content 101C. Some examples of a production data source 101B are shown in FIG. 2B-2G. One or more of these documents may be used to generate an inventory of items included in a line producer's production budget of the visual media content 101C. As will be discussed in further detail below, the inventory of the items included in the line producer's production budget represents a finite set of shoppable items that can be seen, directly or indirectly, from the visual content media. Creating a finite set of shoppable items is particularly important when performing recognition of the desired shoppable item. The recognition may include object recognition of objects (i.e., shoppable items) within a scene image, text recognition when the desired shoppable item is identified by a text description provided by the content consumer 103, or audible recognition when the desired shoppable item is identified by a recording provided by the content consumer 103.

The indexing system 105A creates an index of shoppable items associated with the visual media content 101C. The production data from the production data sources 101B is used to extract information related to the shoppable items representing inventory items (i.e., typically budgeted inventory items) used during the production of the visual media content101C. The extracted information is used to create an index of shoppable items for the visual media content 101C. The indexed shoppable items for the visual media content 101C represent a finite (or bounded) group of shoppable items. The shoppable items within the finite group are assigned metadata by the indexing system 105A.

The indexed data produced by the indexing system 105A is provided to the recognition system 105B. The recognition system 105B performs item recognition on the desired shoppable items. The desired shoppable item data is provided by the content consumer 103. The desired shoppable item data may be image data, text data, or audio data. In various embodiments, image data representing a scene image from the visual content medial 101C is provided. The scene image shows one or more desired shoppable items. In embodiments where the scene image is provided, the recognition system 105B performs object recognition on the scene image to identify the desired shoppable item within the scene image. The recognition system 105B uses the indexed data, which represents a finite group of shoppable items used in the production of the visual media content 101C, to identify or match the desired shoppable item in the scene image with shoppable items within the finite group of shoppable items indexed by the indexing system 105A. The use of a finite group of shoppable items that is indexed with metadata significantly improves the success rate and efficiency of identifying the desired shoppable item. Without a finite group of indexed shoppable items, an object recognition system searches an infinite (or unbounded) group of items in the marketplace. The success rate of finding a match within the entire searchable marketplace would significantly decrease using the object recognition software currently available today.

The matching data is provided to the marketplace system 142. The marketplace system 142 provides item information to the content consumer 103 that would be useful in helping the consumer 103 make a purchasing decision regarding the desired shoppable item, or to gather item information about products or services. The item information may include, for example, item identification information (such as item description, identification numbers, etc.), seller information, pricing information, inventory information, and availability information.

Referring to the production environment 101, the production management system 101A is used to create the visual media content 101C, and during the production of the visual media content 101C, production documents, referred to as production data sources 101B, are generated. The production management system 101A may include production management software to perform one or more of the following functions: budgeting, script breakdown and scheduling for the production of the visual media content 101C. One or more of these functions may also be performed manually by one or more production crew members. One example of production management software included in the production management system 101A is the budgeting and scheduling software created by Movie Magic.

Figure 1B:
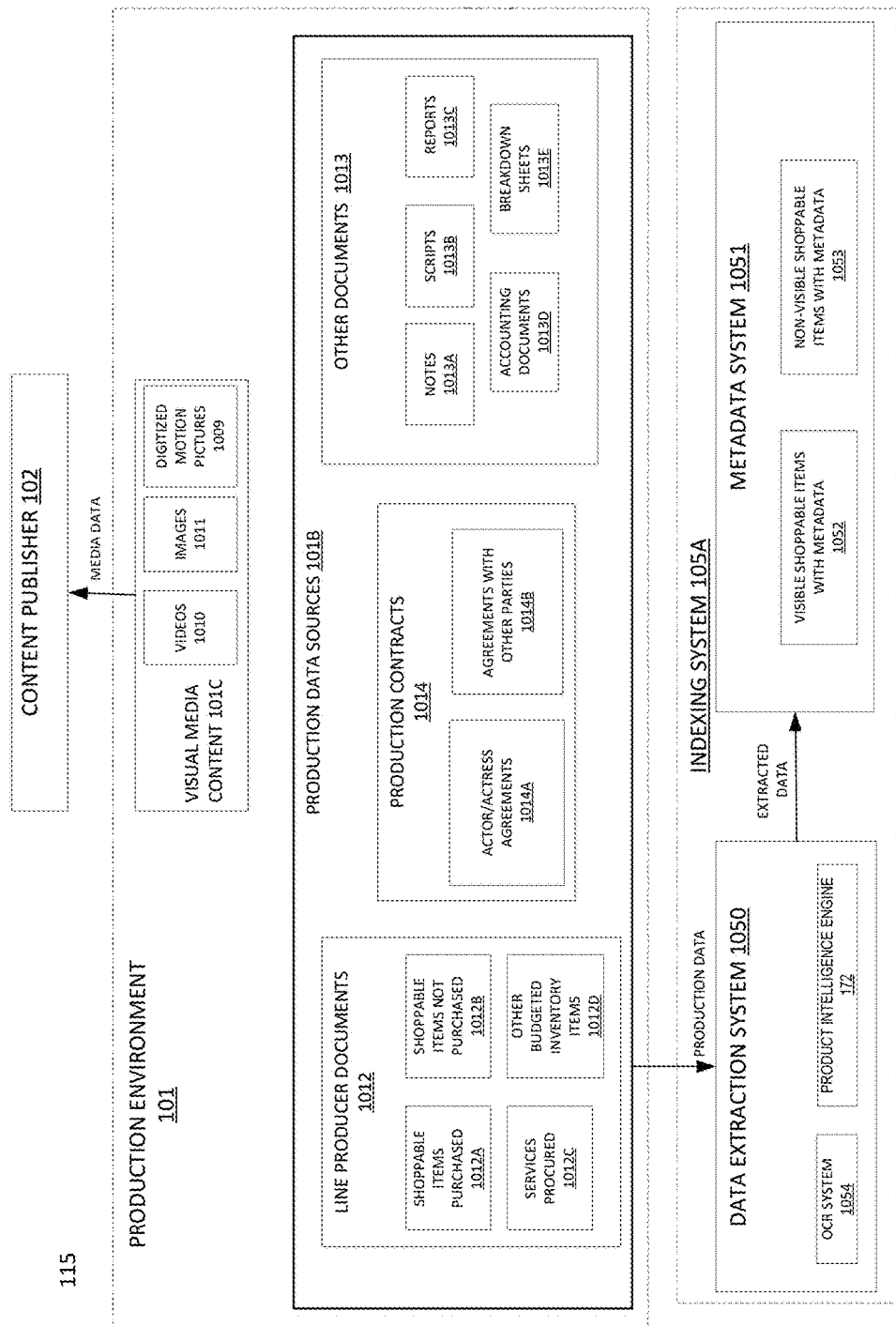
FIG. 1B is a block diagram illustrating a system for extracting information related to shoppable items from production data, according to various embodiments.

FIG. 1B illustrates a system 115 with the production environment 101 providing visual media content to the content publisher 102, and providing the production data to the indexing system 105A, according to an example embodiment. The visual media content 101C may include videos 1010, images 1011, and digitized motion pictures 1009 in example embodiments. Films are also referred to as movies or motion pictures. Many contemporary films are now fully digital through the entire process of production, distribution, and exhibition from start to finish. Other films may be digitized with a digital intermediate, which is a motion picture finishing process. The visual media content 101C is published or distributed by a content provider 102 as media data.

The production data sources 101B include various documents produced during the production of the visual media content 101C. In various embodiments, the production data sources 101B may include line producer documents 1012 for budgeted inventory items, other documents 1013 created during the production of the visual media content 101C, and production contracts 1014. The line producer documents 1012 include an inventory of budgeted items, as well as non-budgeted items, in some embodiments. The inventory items include shoppable items purchased 1012A, shoppable items not purchased 1012B, services procured 1012C for production crew and vendors, and other budgeted inventory items 1012D. The shoppable items purchased 1012A may be tracked using an asset inventory log 240 (FIG. 2E). The shoppable items not purchased may be tracked using the equipment rental log 241 (FIG. 2F) or other tracking logs (not shown). The budgeted inventory items managed by the line producer will be discussed in further detail below.

Film budgeting refers to the process by which a line producer, unit production manager, or filmmaker prepares a budget for a film production. The film budget may be used to secure financing for the production of the film. The film budget may be divided into four sections: above the line (costs related to creative talent), below the line (related to direct production costs), post-production (including visual effects), and other (covers insurance, completion bond, etc.). Examples of production costs include the cost of producing the film such as crew wages, production design, live set and studio costs, costumes, catering, and so forth. During the budgeting process, the line producer (or someone in the line producer's role) keeps an inventory of the shoppable items that were purchased, leased, borrowed, rental, or acquired for use in some other manner as well as a contact list of the crew members and vendors. The production management system 101A (shown in FIG. 1A) may generate a number of reports for budgeting and scheduling and can be used to track the inventory of the shoppable items. All items used in the production of the visual media content101C may be included in the budgeted inventory of the line producer (or someone in the line producer's role).

Figure 2A:
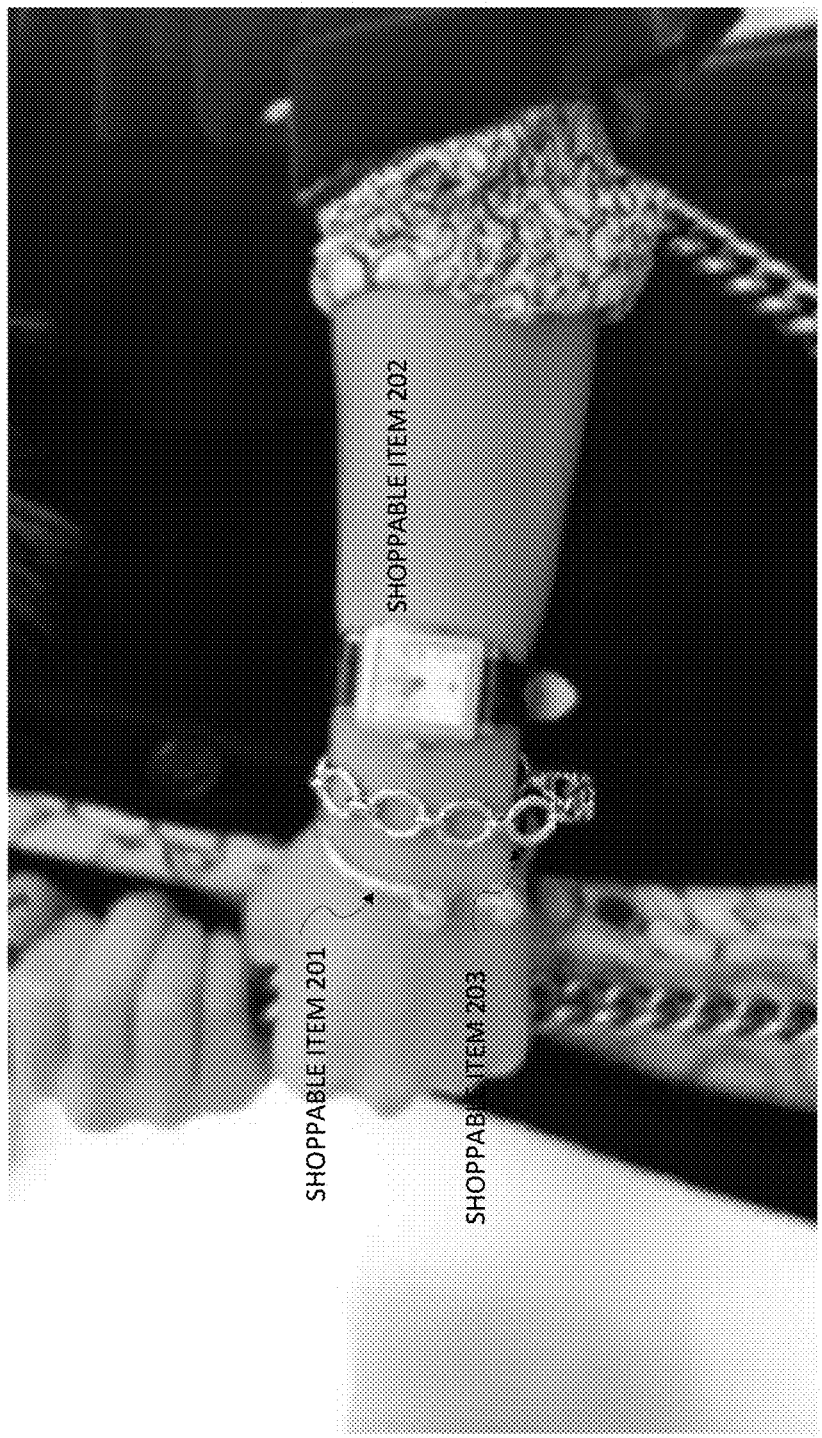
FIG. 2A illustrates an example of an image scene from a visual media content used to identify desired shoppable items, according to one embodiment.
Figure 2B:
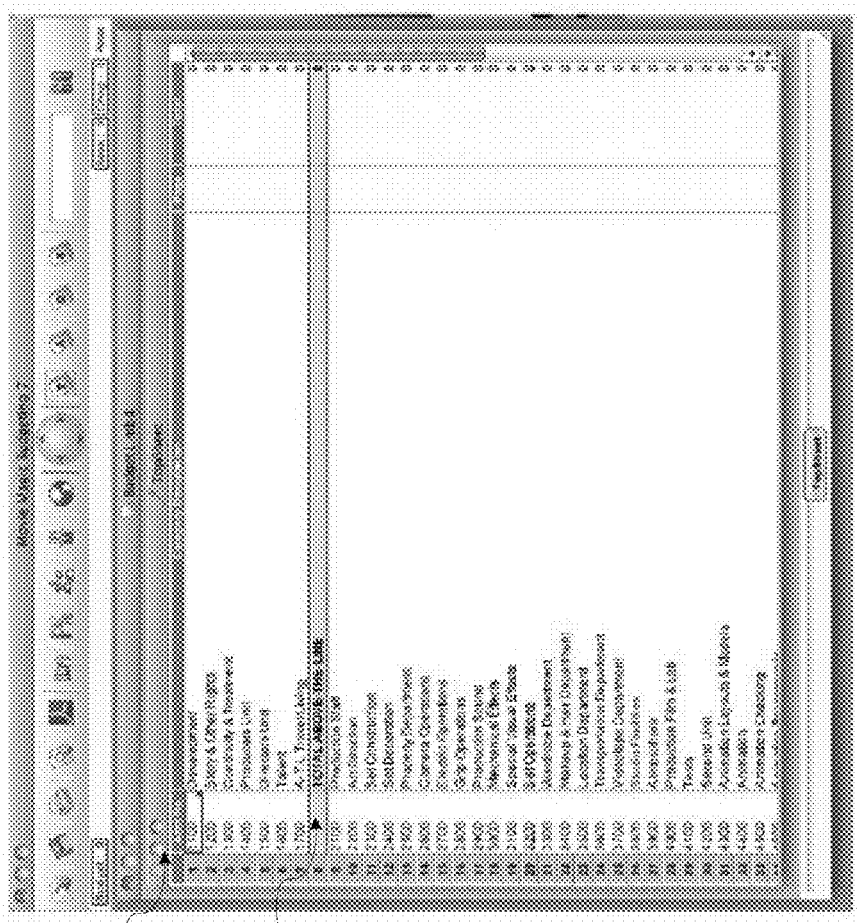
FIG. 2B illustrates an example of a top sheet used during the production of visual media content, according to one embodiment.
Figures 2C, 2D:
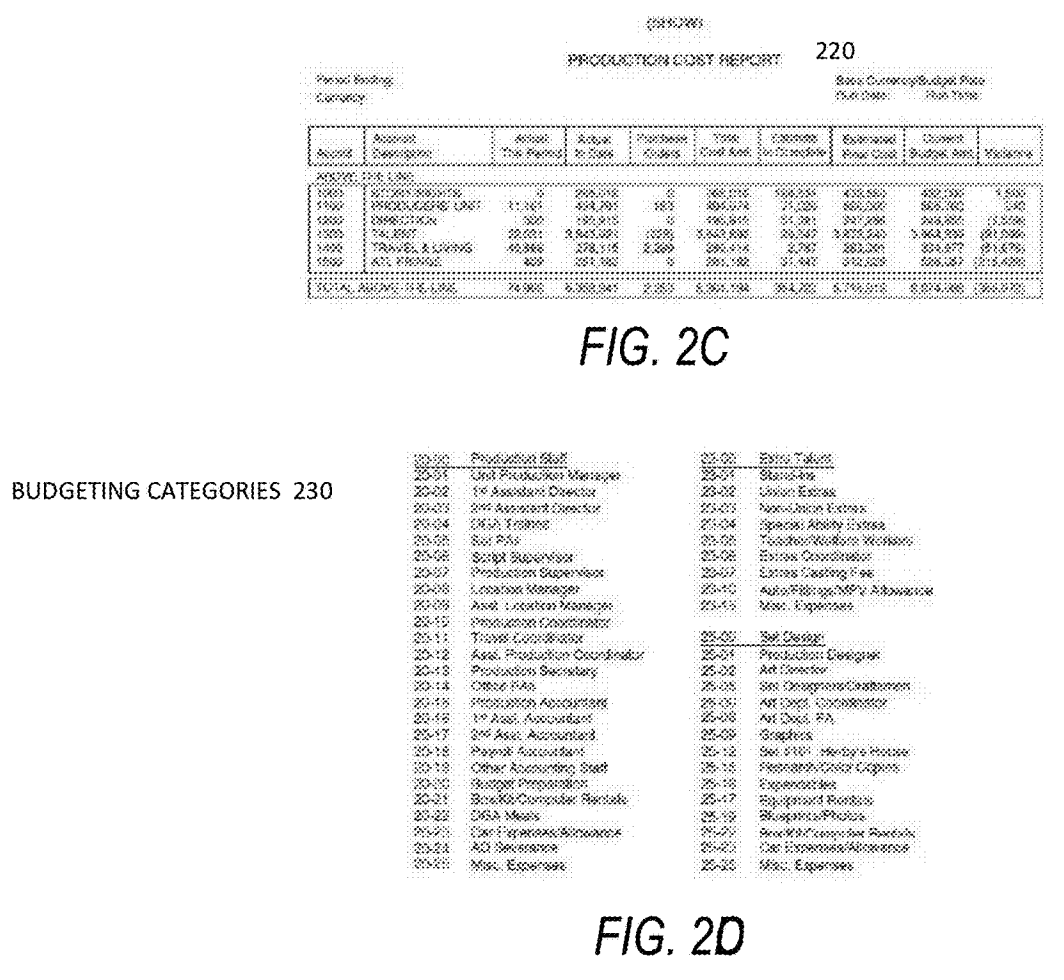

FIG. 2B illustrates a top sheet for a high level budget used to generate visual media content 101C, in an example embodiment. The top sheet 210 shown in FIG. 2B was generated by Movie Magic. The top sheet 210 includes several budget accounts 211, shown by their account numbers and descriptions. The line 212 illustrates the budgeted costs above the line and the budgeted costs below the line. The budgeted inventory of shoppable items used in the production of the visual media content 101C may be included in one or more of the budget accounts shown in the top sheet 210. Additional budgeting categories 230 are shown in FIG. 2D, in an example embodiment. An example of a production cost report 220 is shown in FIG. 2C. FIGS. 2E and 2F are examples of logs used to track the inventory of shoppable items. The asset inventory log 240 shown in FIG. 2E represents a list of the budgeted inventory of shoppable items that were purchased. The asset inventory log 240 may include information for the shoppable items such as item description, where it was purchased, when it was purchased and the purchase order (PO) number. The inventory rental log shown in FIG. 2F includes the item description, vendor and vendor's contact information, and PO number of the budgeted inventory of the shoppable items that were rented.

Figure 2G:
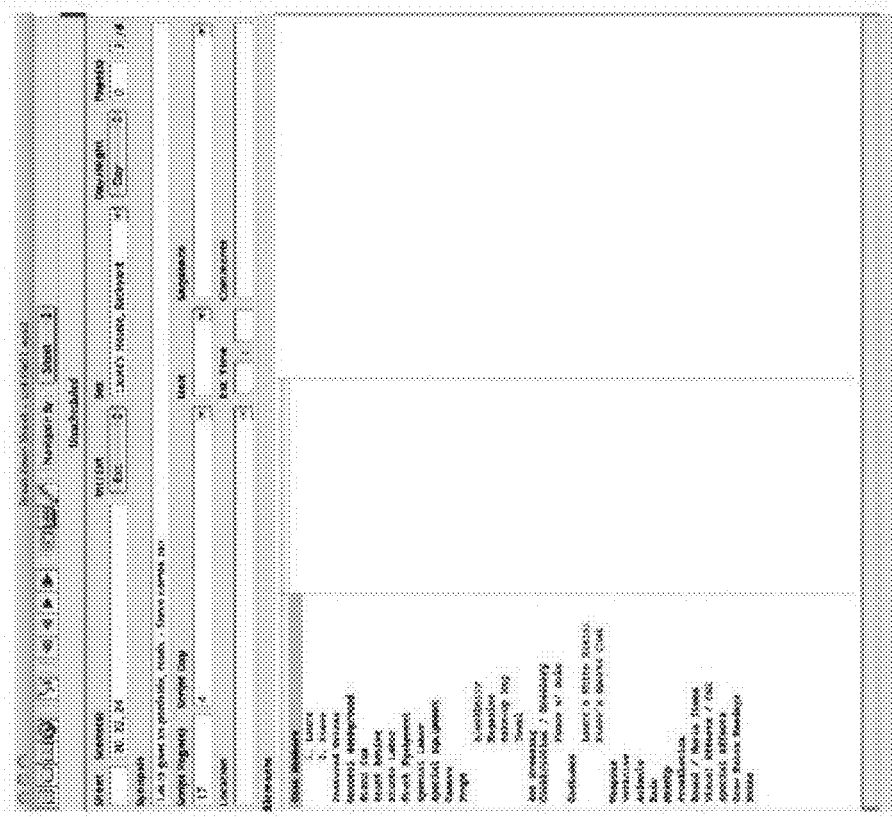
FIG. 2G illustrates an example of a breakdown sheet used during the production of visual media content, according to one embodiment.

Referring back to FIG. 1B, the other documents 1013 created during the production of the visual media content 101C include notes 1013A, scripts 1013B, reports 1013C, accounting documents 1013D, and breakdown sheets 1013E, in example embodiments. The notes 1013A may refer to notes written by various crew members, such as the producer, director, assistant director, and line producer, related to the production of the visual media content 101C. The reports may be generated manually or electronically by the production management system 101A, an accounting system, or any other systems used during the production of the visual media content 101C. The accounting documents may include receipts, POs, or various budgeting or cost related documents or reports, such as those shown in FIGS. 2A-2C. An example of a breakdown sheet from 1013E is shown in FIG. 2G. The production contracts 1014 include actor/actress agreements 1014A and agreements with other parties 1014B such as vendors and merchants. The production data sources 101B shown in FIG. 1B are for illustration only, and in alternative embodiments, other types of documents generated during the production of the visual media content 101C may be used.

During the production of the visual media content101C, the producer (or an assistant director) reviews the script and marks certain elements that need to be addressed before and during production. This process is referred to as "breaking down the script." Historically, this was a manual process where notes were handwritten onto breakdown sheets, which were transferred onto individual cardboard strips that were then arranged and rearranged on strip boards. The production management system 101A, which may include one of more of the functions of budgeting, script breakdown, and scheduling, may be used to capture the breakdown data from the line producer (or an assistant director) such that the breakdown sheets may be captured electronically. FIG. 2G illustrates an example breakdown sheet 250. The breakdown sheet 250 may represent one of the breakdown sheets 1013E. The breakdown sheets 1013E are numbered in sequence, with each one representing a scene. Sometimes more than one scene is combined in a single breakdown sheet 1013E if the scenes take place at the same location with the same characters at the same time of the day. The breakdown sheets 1013E are used to note the specific requirements for the following departments: wardrobe, props, set dressing, art department/construction, special personnel, vehicles, cameras, special (mechanical) effects, special equipment, animals, sound effects, music, and so forth. In addition to the various asset and rental tracking logs (e.g., 230 and 240), other information related to shoppable items is captured in the breakdown sheets. For example, information regarding shoppable items which are not directly visible from a scene image may be captured in the breakdown sheets. FIGS. 3A-3E illustrate several examples of non-visible shoppable items. Furthermore, since the breakdown sheets track information on a scene by scene basis, metadata for the scene number for the shoppable items may be generated. As such, the shoppable items may be indexed and searched by scene number, and the recognition algorithms may be performed in a more efficient manner. Additionally, scene-to-scene offerings may be offered to viewers by using scene metadata along with the other metadata associated with shoppable items.

The indexing system 105A, which is part of the shoppable item system 150 (shown in FIG. 1A), includes a data extraction system 1050 and a metadata system 1051 as shown in FIG. 1B. Production data is received by the data extraction system 1050. The production data represents data from the production data sources 101B. By using an object character recognition system (OCR) 1054 and product intelligence data from a product intelligence engine 172, the relevant data is extracted from the production data. The production data may be unformatted or unstructured data. In some embodiments, the product intelligence engine 172 may be included within a marketplace system, which has access to historical item information, including item descriptions, prices, brand names, models, sellers of the items, historical purchasing information, and so forth. The use of the product intelligence data enables the data extraction system 1050 to distinguish between data related to shoppable items and data not related to shoppable items. For example the product intelligence data recognizes brand names and will extract brand name data. If the data extraction system 1050 recognizes the term "Chanel," it would likely recognize it as a brand name (rather than a person's name), and extract that piece of information from the production data.

The extracted data from the data extraction system 1050 is provided to the metadata system 1051. The metadata system 1051 tags the shoppable items with metadata. The tagged shoppable items are used to create an index of the shoppable items used in the production of the visual media content 101C. The indexed shoppable items represent a bounded group of shoppable items that is used during the item recognition process performed by the item recognition system 105B. The bounded data set of indexed shoppable items (representing a super-set of all potential items for purchase) makes it easier to automate the item recognition process. The index of the shoppable items enables efficient searching and matching by the indexing system 105B, shown in FIG. 1C. The metadata system 1051 includes visible shoppable items with metadata 1052 and non-visible shoppable items with metadata 1053. The indexed data generated by the indexing system 105A is accessed by the recognition system 105B.

Figure 1C:
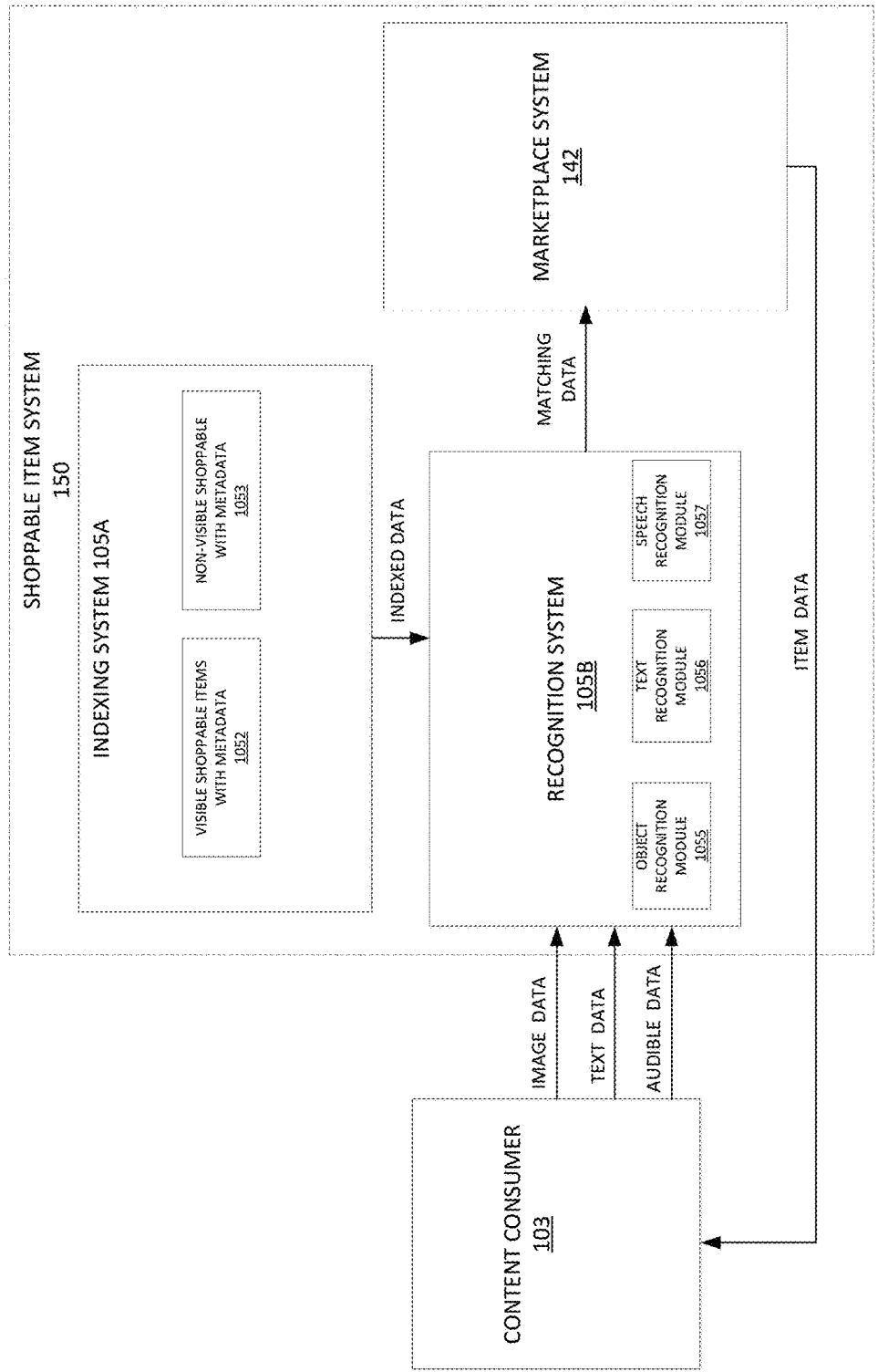
FIG. 1C is a block diagram illustrating a system identifying desired shoppable items from a group of shoppable items using object recognition, according to various embodiments.

FIG. 1C illustrates the recognition system 105B receiving indexed data from the indexing system 105A, according to one embodiment. The recognition system 105B also receives user provided data from the content consumer 103. The user provided data may be image data provided to an object recognition module 1055, text data provided to a text recognition module 1056, and audio data provided to a speech recognition module 1057. Depending on the type of user provided data (e.g., image, text, or audio), the recognition system 105B identifies one or more shoppable items using item recognition with object recognition, text recognition, or speech recognition. The item recognition algorithms performed by the recognition system 105B use the indexed data generated by the indexing system 105A to limit the amount of marketplace items that the recognition algorithms need to consider as possible matches for the desired shoppable items. Rather than searching an unbounded number of marketplace items for matches, the number of possible matches is limited to an identified group of shoppable items, which has been indexed and tagged with metadata for simplified searching and item identification.

For example, the indexed data may represent a group of 10,000 shoppable items used during the production of the visual media content 101C. On the other hand, if the recognition algorithms are not limited to searching an identifiable group of shoppable marketplace items, an unbounded number of shoppable marketplace items may need to be considered (or compared to) before a match is found for the desired shoppable item. Such a large unbounded number of possibilities may make it difficult or impossible to use recognition in many cases. Furthermore, by indexing the identified shoppable items with metadata, searching for potential matches is performed in an organized manner using structured data.

An example of object recognition performed by the object recognition module 1055 is described below. A content consumer 103 provides the image data representing the scene image 200 shown in FIG. 2A in this example. The scene image 200 may have been captured by a camera integrated in the content consumer's 103 client device 110 with a screen shot while the content consumer 103 was viewing the visual media content 101C (e.g., video). The image data representing the scene image 200 is received by the object recognition module 1055 for object recognition.

In this example, the object recognition algorithms first generically identify all the shoppable items presented in the scene image 200. The shoppable items 201, 202 and 203 are identified as shoppable items, whereas everything else in the scene image 200 is identified as non-shoppable items. At this point, the shoppable items are generically classified as shoppable items without specific item information. We may refer to this as generically classified shoppable items. For example, the shoppable item 202 may be classified as a type of watch, but specific details of the watch are not yet known (for example, the brand, manufacturer, model, etc. are not yet known). The shoppable items 201 and 203 may be generically classified as jewelry or bracelets.

In the same example, the generically classified shoppable items are then matched with specific shoppable items within the finite group of shoppable items provided by the indexed data. The finite group of shoppable items represent the shoppable items used in the production of the visual media content 101C, representing a definitive set of all potential items for purchase. By having an identified finite group of shoppable items, the object recognition algorithms may efficiently find matches of the shoppable items 201, 202, and 203 within the shoppable items from the group of indexed shoppable items. Once the matches are made between the desired shoppable items (identified via object recognition from the scene image 200) with the shoppable items from the group of indexed shoppable items, specific details about the desired shoppable items can be obtained from the shoppable item metadata. For example, information extracted from the asset inventory log 240 (e.g., item description, vendor information, PO number) or other production data sources 101B may be stored as shoppable item metadata and available as specific details about the desired shoppable items. In one embodiment, the stock keeping unit (SKU) number or other item identification number used by vendors may have been extracted from receipts or POs and stored as shoppable item metadata.

In some embodiments, the object recognition module 1055 may determine the scene number in which the scene image 200 was taken. If the scene information is known or identified by the object recognition module 1055, then the group of shoppable items used during the production of the visual media content 101C may be further narrowed to the shoppable items used in the production of that specific scene of the visual media content 101C. As a result, products may eventually be offered to the content consumer 103 on a scene-by-scene basis. The scene numbers may be extracted from the breakdown sheets 1013E and stored as shoppable item metadata.

In this example, after object recognition has been performed by the objection recognition module 1055, matched data is provided to the marketplace system 142. In various embodiments, the matched data may include the specific details about the shoppable items. For example, the matched data for shoppable item 202 may specify the shoppable item 202 is a Cartier watch for women, tank solo model with reference number W5200005.

Figure 1D:
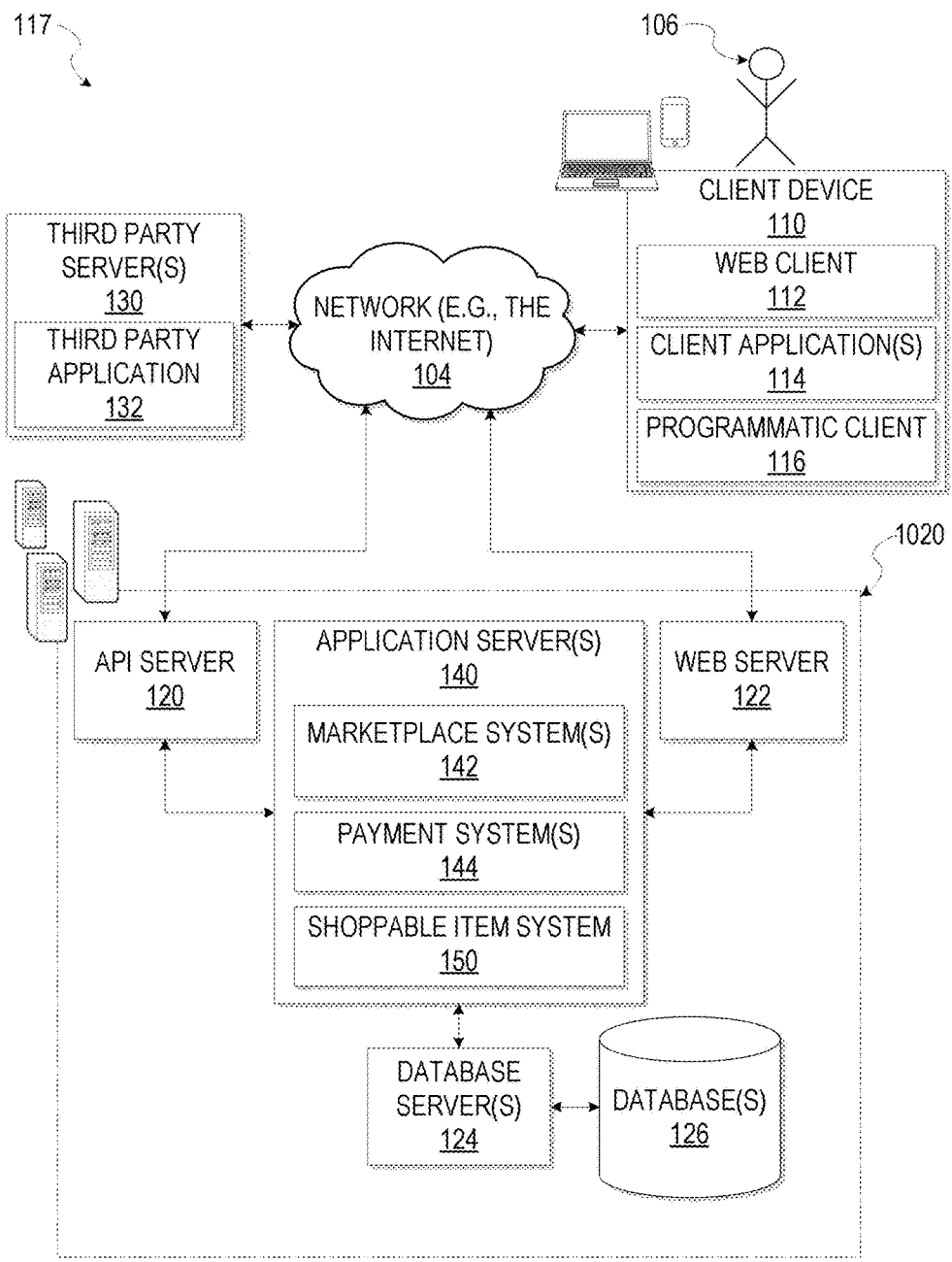
FIG. 1D is a block diagram illustrating a networked system, according to some example embodiments.

With reference to FIG. 1D, an example embodiment of a high-level client-server-based network architecture 117 is shown. A networked system 1020 provides server-side functionality via a network 104 (e.g., the Internet or wide area network (WAN)) to a client device 110. A user 106 may interact with the networked system 1020 using the client device 110. The user 106 may represent the content consumer 103. FIG. 1D illustrates, for example, a web client 112 (e.g., a browser, such as the Internet Explorer® browser developed by Microsoft® Corporation of Redmond, Wash. State), client application(s) 114, and a programmatic client 116 executing on the client device 110. The client device 110 may include the web client 112, the client application(s) 114, and the programmatic client 116 alone, together, or in any suitable combination. Although FIG. 1D shows one client device 110, multiple client devices may be included in the network architecture 117.

The client device 110 may comprise a computing device that includes at least a display and communication capabilities that provide access to the networked system 1020 via the network 104. The client device 110 may comprise, but is not limited to, a remote device, work station, computer, general purpose computer, Internet appliance, hand-held device, wireless device, portable device, wearable computer, cellular or mobile phone, personal digital assistant (PDA), smart phone, tablet, Ultrabook, netbook, laptop, desktop, multi-processor system, microprocessor-based or programmable consumer electronic, game consoles, set-top box, network personal computer (PC), mini-computer, and the like. In further example embodiments, the client device 110 may comprise one or more of a touch screen, accelerometer, gyroscope, biometric sensor, camera, microphone, global positioning system (GPS) device, and the like.

The client device 110 may communicate with the network 104 via a wired or wireless connection. For example, one or more portions of the network 104 may be an ad hoc network, an intranet, an extranet, a Virtual Private Network (VPN), a Local Area Network (LAN), a wireless LAN (WLAN), a WAN, a wireless WAN (WWAN), a Metropolitan Area Network (MAN), a portion of the Internet, a portion of the Public Switched Telephone Network (PSTN), a cellular telephone network, a wireless network, a Wireless Fidelity (Wi-Fi®) network, a Worldwide Interoperability for Microwave Access (WiMAX) network, another type of network, or a combination of two or more such networks.

The client device 110 may include one or more applications (also referred to as "apps") such as, but not limited to, web browsers, book reader apps (operable to read e-books), media apps (operable to present various media forms including audio and video), fitness apps, biometric monitoring apps, messaging apps, electronic mail (email) apps, e-commerce site apps (also referred to as "marketplace apps"), and so on. The client application(s) 114 may include various components operable to present information to the user and communicate with networked system 1020. In some embodiments, if the e-commerce site application is included in the client device 110, then this application may be configured to locally provide the user interface and at least some of the functionalities with the application configured to communicate with the networked system 1020, on an as needed basis, for data or processing capabilities not locally available (e.g., access to a database of items available for sale, to authenticate a user, to verify a method of payment). Conversely, if the e-commerce site application is not included in the client device 110, the client device 110 may use its web browser to access the e-commerce site (or a variant thereof) hosted on the networked system 1020.

In various example embodiments, the users 106 may be a person, a machine, or other means of interacting with the client device 110. In some example embodiments, the users 106 may not be part of the network architecture 117, but may interact with the network architecture 117 via the client device 110 or another means. For instance, the users 106 may interact with a client device 110 that may be operable to receive input information from (e.g., using touch screen input or alphanumeric input) and present information to (e.g., using graphical presentation on a device display) the users 106. In this instance, the users 106 may, for example, provide input information to the client device 110 that may be communicated to the networked system 1020 via the network 104. The networked system 1020 may, in response to the received input information, communicate information to the client device 110 via the network 104 to be presented to the users 106. In this way, the users 106 may interact with the networked system 1020 using the client device 110.

An Application Program Interface (API) server 120 and a web server 122 may be coupled to, and provide programmatic and web interfaces respectively to, one or more application server(s) 140. The application server(s) 140 may host one or more marketplace system(s) 142, payment system(s) 144, and the shoppable item system 150, each of which may comprise one or more modules or applications and each of which may be embodied as hardware, software, firmware, or any combination thereof. The application server(s) 140 are, in turn, shown to be coupled to one or more database server(s) 124 that facilitate access to one or more information storage repositories or database(s) 126. In an example embodiment, the database(s) 126 are storage devices that store information to be posted (e.g., publications or listings) to the marketplace system(s) 142. The database(s) 126 may also store digital products information, in accordance with some example embodiments.

Additionally, a third party application 132, executing on a third party server 130, is shown as having programmatic access to the networked system 1020 via the programmatic interface provided by the API server 120. For example, the third party application 132, utilizing information retrieved from the networked system 1020, may support one or more features or functions on a website hosted by the third party. The third party website may, for example, provide one or more promotional, marketplace, or payment functions that are supported by the relevant applications of the networked system 1020.

The marketplace system(s) 142 may provide a number of publication functions and services to the users that access the networked system 1020. The payment system(s) 144 may likewise provide a number of functions to perform or facilitate payments and transactions. While the marketplace system(s) 142 and payment system(s) 144 are shown in FIG. 1D to both form part of the networked system 1020, it will be appreciated that, in alternative embodiments, each system 142 and 144 may form part of a payment service that is separate and distinct from the networked system 1020. In some example embodiments, the payment system(s) 144 may form part of the marketplace system(s) 142.

The shoppable item system 150 may provide functionality to match desired shoppable items (seen while viewing the visual media content 101C) with shoppable items (both visible and non-visible) used in the production of the visual media content 101C. The matching of the desired shoppable items with the shoppable items used in the production of the visual media content 101C provides some details about the desired shoppable items such that a marketplace system may be used to search, recommend, and purchase the desired shoppable item. In some example embodiments, the system 150 may communicate with the client device 110, the third party server(s) 130, the marketplace system(s) 142 (e.g., retrieving listings), and the payment system(s) 144 (e.g., purchasing a listing). In an alternative example embodiment, the system 150 may be a part of the marketplace system(s) 142. In an example embodiment, the shoppable item system 150 is integrated with the marketplace system(s) 142.

Further, while the client-server-based network architecture of system 100 shown in FIG. 1D employs a client-server architecture, the present inventive subject matter is, of course, not limited to such an architecture, and may equally well find application in a distributed, or peer-to-peer, architecture system, for example. The various systems of the applications server(s) 140 (e.g., the marketplace system(s) 142 and the payment system(s) 144) may also be implemented as standalone software programs, which do not necessarily have networking capabilities.

The web client 112 may access the various systems of the networked system 1020 (e.g., the marketplace system(s) 142) via the web interface supported by the web server 122. Similarly, the programmatic client 116 and client application(s) 114 may access the various services and functions provided by the networked system 1020 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 1020 in an offline manner, and to perform batch-mode communications between the programmatic client 116 and the networked system 1020.

Figure 1E:
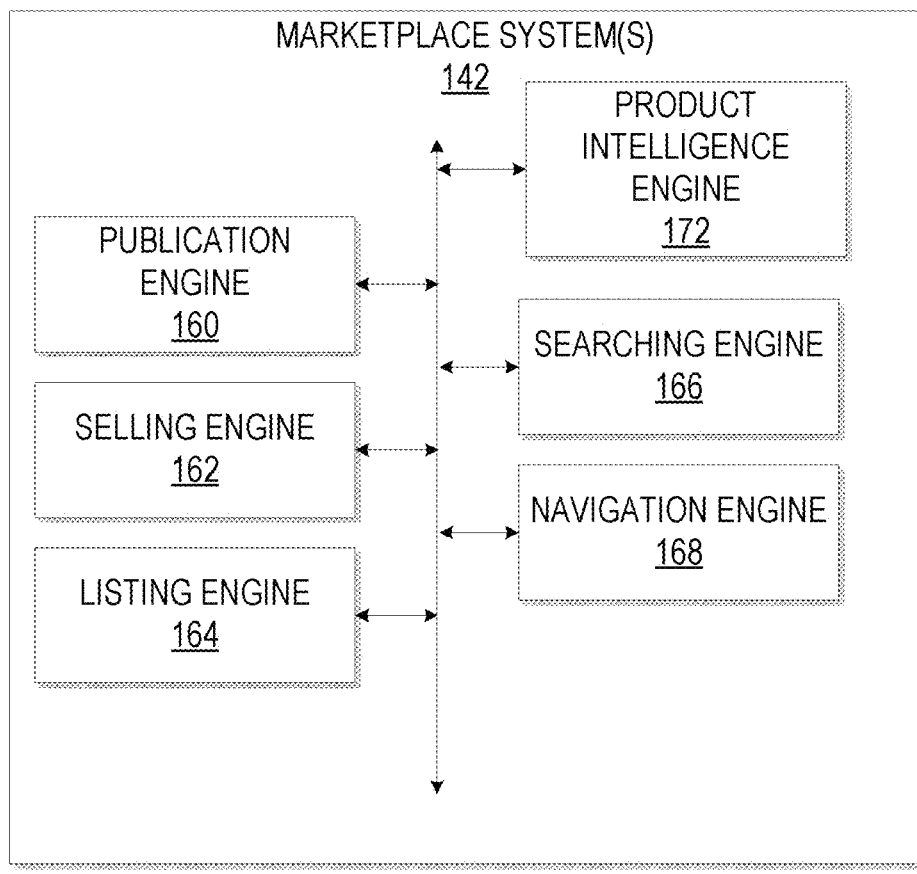
FIG. 1E illustrates a block diagram showing components provided within the system of FIG. 1D, according to some example embodiments.

FIG. 1E illustrates a block diagram showing components provided within the marketplace system(s) 142, according to some embodiments. In various example embodiments, the marketplace system(s) 142 may comprise a marketplace system to provide marketplace functionality (e.g., facilitating the purchase of items associated with item listings on an e-commerce website). The networked system 1020 may be hosted on dedicated or shared server machines that are communicatively coupled to enable communications between server machines. The components themselves are communicatively coupled (e.g., via appropriate interfaces) to each other and to various data sources, so as to allow information to be passed between the applications or so as to allow the applications to share and access common data. Furthermore, the components may access one or more database(s) 126 via the database server(s) 124.

The networked system 1020 may provide a number of publishing, listing, and price-setting mechanisms whereby a seller (also referred to as a "first user") may list (or publish information concerning) products or services for sale or barter, a buyer (also referred to as a "second user") can express interest in or indicate a desire to purchase or barter such products or services, and a transaction (such as a trade) may be completed pertaining to the products or services. To this end, the networked system 1020 may comprise a publication engine 160 and a selling engine 162. The publication engine 160 may publish information, such as item listings or product description pages, on the networked system 1020. In some embodiments, the selling engine 162 may comprise one or more fixed-price engines that support fixed-price listing and price setting mechanisms and one or more auction engines that support auction-format listing and price setting mechanisms.

A listing engine 164 allows sellers to conveniently author listings of items. In one embodiment, the listings pertain to products or services that a user (e.g., a seller) wishes to transact via the networked system 1020. In some embodiments, the listings may be an offer, deal, coupon, or discount for a good or service. Each good or service is associated with a particular category. The listing engine 164 may receive listing data such as title, description, and aspect name/value pairs. Furthermore, each listing for a good or service may be assigned an item identifier. The listing information may then be stored to one or more storage devices coupled to the networked system 1020 (e.g., database(s) 126). Listings also may comprise product description pages that display a product and information (e.g., product title, specifications, and reviews) associated with the product. In various embodiments, the listing information may represent item information provided to the content consumer 103. In some embodiments, the product description page may include an aggregation of item listings that correspond to the product described on the product description page. Searching the networked system 1020 is facilitated by a searching engine 166. For example, the searching engine 166 enables keyword queries of listings published via the networked system 1020. In a further example, a navigation engine 168 allows users to navigate through various categories, catalogs, or inventory data structures according to which listings may be classified within the networked system 1020.

A product intelligence engine 172 accesses data from the various other engines in the marketplace system(s) 142 to assist indexing system 105A (shown in FIG. 1A) in extracting data from the production data. In particular, the data extraction system 1050 is the component within the indexing system 105A that is responsible for extracting information about shoppable items used in the production of the visual media content 101C from the production data. The product intelligence engine 172 distinguishes between shoppable items and non-shoppable items based on data from the marketplace system(s) 142. The product intelligence engine 172 recognizes various brand names, product descriptions, product categories, product identification numbers, and the like that may be included within the production data. By identifying information relevant to items (either products or services), the data for shoppable items is extracted from the production data, regardless of whether the production data is formatted or unformatted data from numerous sources.

Figure 3A:
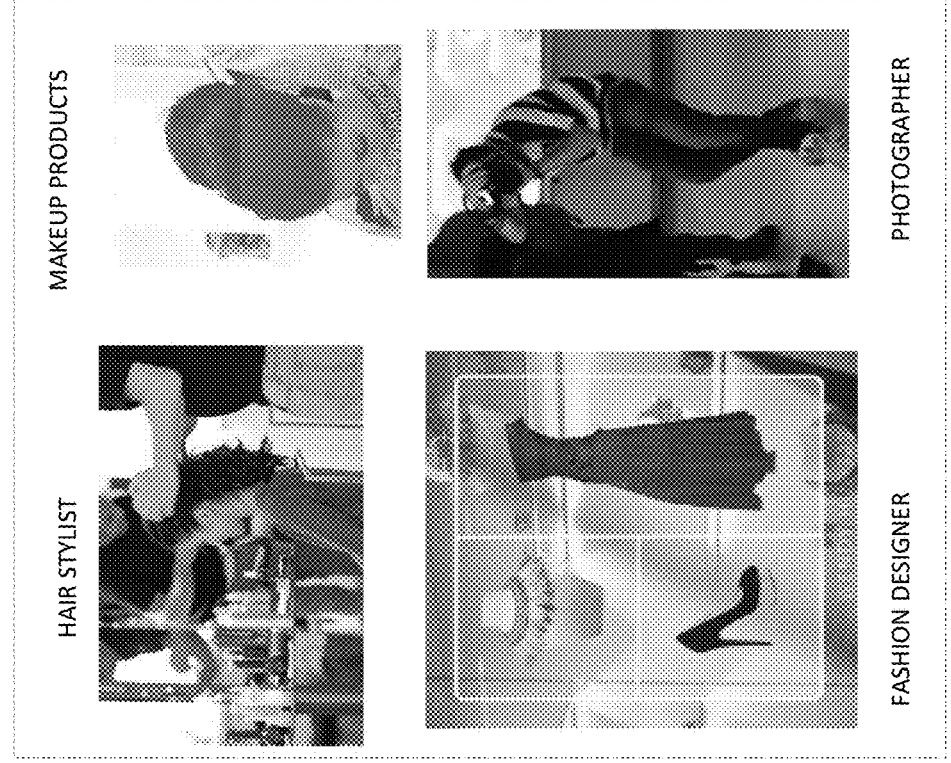
FIG. 3A illustrates scene images and non-visible shoppable items associated with the scene images in one embodiment.
Figure 3A:
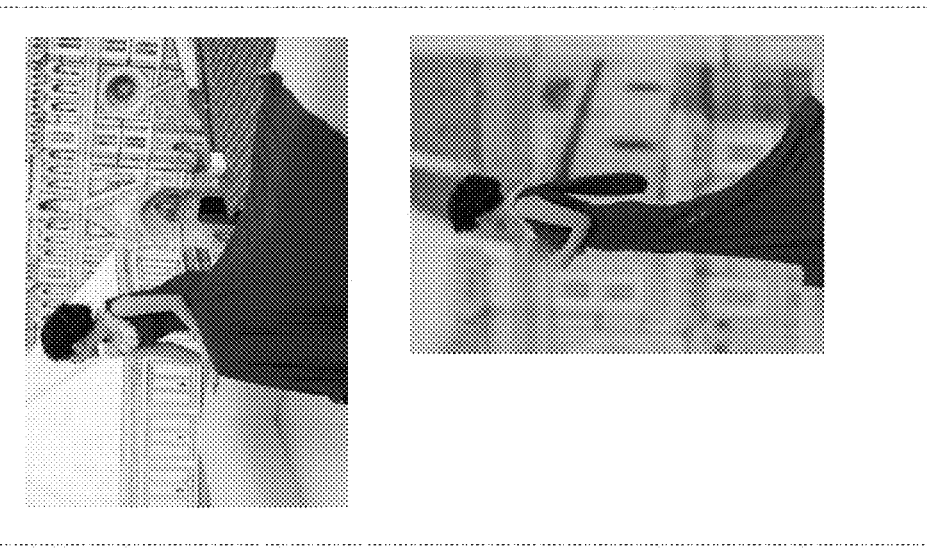

FIGS. 3A-3E illustrate scene images where non-visible shoppable items are associated with scene images. Although FIG. 3A illustrates scene images 355 that include many visible shoppable items, the desired shoppable items of the content consumer 103 are non-visible items. The non-visible items 356 do not represent scene images, but are used to illustrate examples of non-visible shoppable items about which a content consumer 103 may desire to obtain additional information (e.g., item information for the non-visible shoppable items). For example, the content consumer 103 would like to know the name of the hair stylist of the women in the blue dress, the makeup products used on the women, the fashion designer who selected the wardrobe (e.g., blue dress, shoes, and necklace) for the scene, and the photographer who shot the pictures and the type of camera used to shoot the images in the scene images 355. In some embodiments, shoppable items having a visible component may be referred to as a non-visible shoppable item because the visible component is not detailed enough for object recognition. Although the makeup products have a visible component, they may be referred to as a non-visible shoppable item because of the difficulty in using object recognition to identify the shoppable item.

In various embodiments, the content consumer 103 communicates via user provided data in the form of either text data or audio data, in addition to image data, what his or her desired shoppable items are. The recognition system 105B receives the user provided data represented as image data, text data, or audio data (or in any combination of these data types) and performs item recognition using the finite group of indexed shoppable items used in the production of the visual media content 101C. A combination of object recognition, text recognition, and speech recognition may be used to identify the non-visible desired shoppable items. For example, object recognition may be used to identify the actress, blue dress, shoes and necklace shown in FIG. 3A.

Scene information may be obtained (or extracted) from the breakdown sheets 1013E to identify the specific scene where the scene images 355 were taken. Other metadata may be extracted from the breakdown sheets 1013E and other production data sources 101B. Production crew members or vendors who provided the services associated with the non-visible desired shoppable items may be identified from metadata associated with visible or non-visible shoppable items associated with the scene images 355 (or scene), or metadata associated with the scene images 355 (or scene) or an actress in the scene images 355. In some embodiments, the scene may be identified by a scene number associated with the scene images 355.

Figure 3B:
FIGS. 3B-3E illustrate examples of non-visible shoppable items, according to various embodiments.

FIG. 3B illustrates a scene image 370 showing a group of performers. The scene image 370 is provided as image data, along with the text data 371 "What is the name of the dance choreographer of this performance?" The text data 371 is used to identify the content consumer's 103 desired shoppable item, which is a non-visible item. The non-visible shoppable item in FIG. 3B is the name of the production crew member responsible for the dance choreography of the performers shown in the scene image 370. The desired non-visible shoppable item in this example is associated with scene image 370 which shows the performers.

Figure 3C:

FIG. 3C illustrates a scene image 375 showing a band performing. The scene image 375 is provided as image data, along with the text data 376 "What is the sound equipment used by this band in the video?" The scene image 375 and the text data 376 are used to identify the desired shoppable item, which is non-visible. The non-visible shoppable item in FIG. 3C is the sound equipment that the content consumer 103 heard while watching the video. In this example, the non-visible desired shoppable item is associated with the scene image 375, but is also associated with an audio component from the video.

Figure 3D:
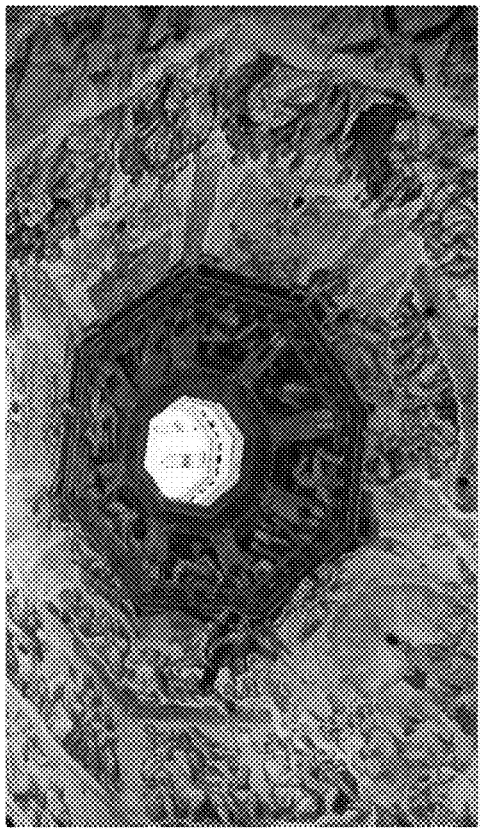

FIG. 3D illustrates a scene image 380, which is associated with a desired shoppable item that is non-visible. The audio data 381 represents a recording by the content consumer 103 and is used to identify the non-visible desired shoppable item. The audio data 381 includes the recorded message "What camera was used to take this picture?" The image data for the scene image 380 and the audio data 381 for the recording are provided to the recognition system 105B to identify the non-visible desired shoppable item.

Figure 3E:
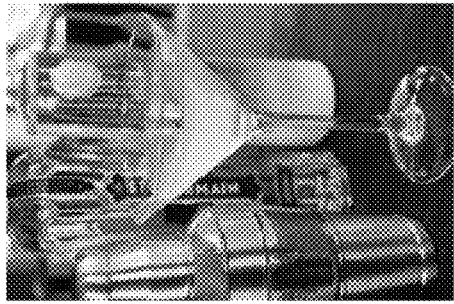

FIG. 3E illustrates a scene image 390 of a filled martini glass. While watching the video, the content consumer 103 hears the actors say "This martini is the best martini I have ever tasted." After hearing this, the content consumer 103 is interested in finding out the ingredients for this fantastic martini recipe. The user provided data 391 is a combination of data provided to the recognition system 105B. In one example, the image data representing the scene image 390 may be provided in combination with the audio data from the actor's lines. In another example, either the image data or the audio data from the user provided data 391 may be provided. The text data from the user provided data 391 is used by the recognition system 105B to identify the non-visible shoppable item. The non-visible desired shoppable item in this example is a list of ingredients or the recipe used to make the martini shown in the scene image 390.

The examples described in FIGS. 3A-3E represent a few types of shoppable items which are not visible to the content consumer 103. Although the desired shoppable items are not visible from a scene image, the non-visible shoppable item is associated with a scene image, either visually or audibly. Furthermore, when identifying desired shoppable items that are not visible to the content consumer 103, the content consumer 103 provides either text data or audible data, or both, to the recognition system 105B. The text data or audible data is used by the recognition system 105B to identify the shoppable item desired by the content consumer 103 such that the recognition system 105B does not focus on the visible shoppable items shown in a scene image. The recognition system 105B performs object recognition 1055, text recognition 1056, or speech recognition 1057, or a combination of recognition types, depending on the type of user provided data received (e.g., image data, text data or audible data).

The matched data is received by the marketplace system 142 and used to produce item information. The item information represents any information about a desired shoppable item that may be useful to the content consumer 103 in making a purchasing decision about the desired shoppable item or in purchasing the shoppable item, either online or offline. The item information may include item identification information (e.g., product identification ID or SKU), product description, brand, color, model, merchants, product availability, delivery information, price information, shipping information, return and guarantee information, and so forth. Additional information may be provided for services, rather than products, offered (for example, rates for performing services and other service-related information).

FIGS. 4A-4D illustrate flow diagrams for various embodiments. In various embodiments, additional operations may be added to each of the flow diagrams 400-420, or one or more operations may be deleted from each of the flow diagrams 400-420. In further embodiments, the operation flow diagrams 400-420, or variants of these flow diagrams, may be combined. The operations performed in the flow diagrams 400-420, may be performed by one or more components or modules within the shoppable item system 150.

Figure 4A:
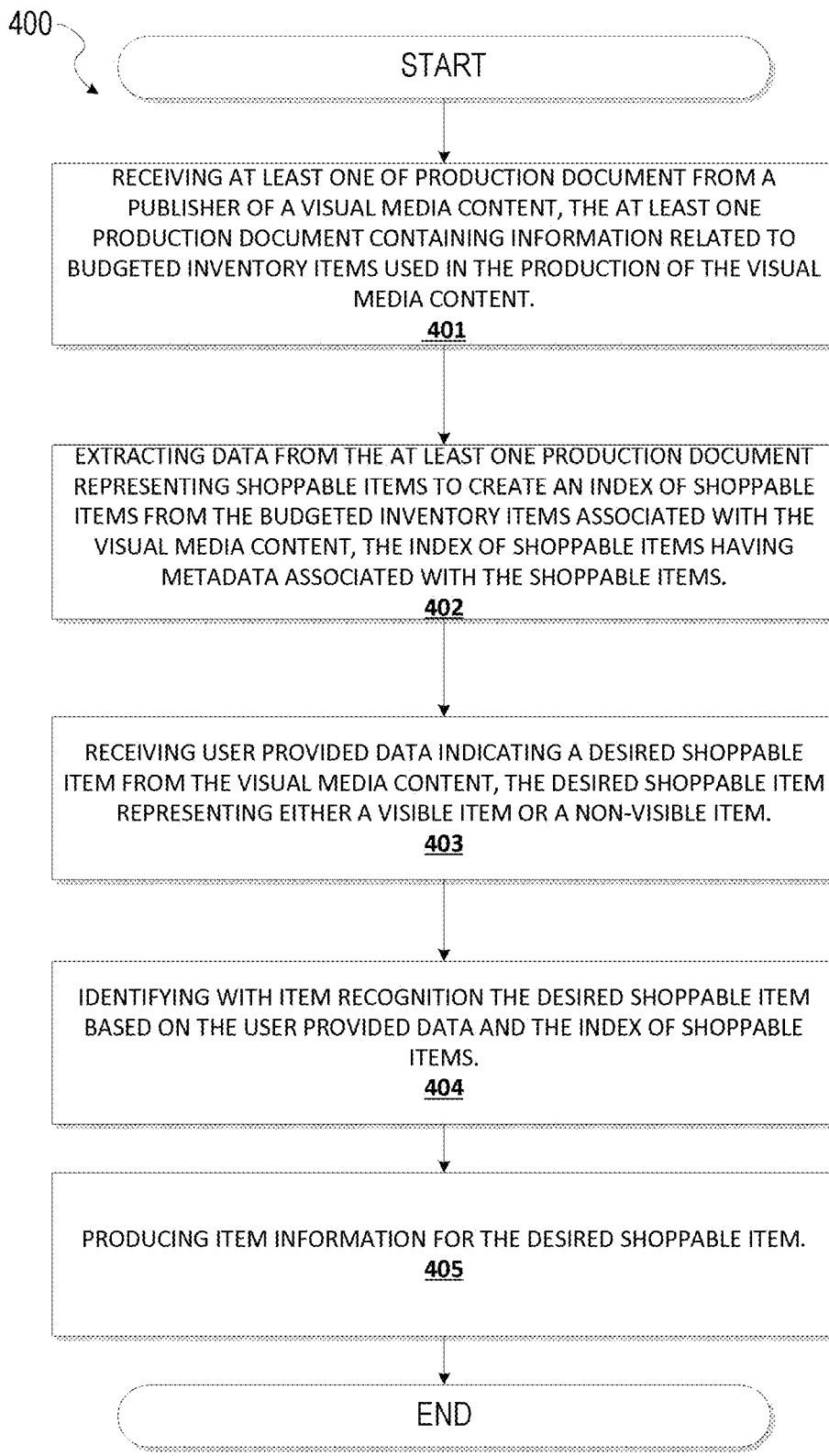
FIG. 4A is a flow diagram illustrating an example method for producing item information for desired shoppable items seen while viewing visual media content, according to various embodiments.

FIG. 4A is a flow diagram illustrating an example method for obtaining information regarding a desired shoppable item identified in visual media content, according to one embodiment. The flow diagram 400 includes operations 401-405.

At operation 401, at least one production document from a publisher of visual media content 101C is received. The at least one production document contains information related to inventory items used in the production of the visual media content 101C. In example embodiments, the production data sources 101B illustrate various production documents that may be received. The data received from the production data sources 101B may be referred to as production data.

At operation 402, data from the at least one production document representing shoppable items is extracted to create an index of shoppable items associated with the visual media content 101C. The index includes metadata associated with the shoppable items. In example embodiments, the indexing system 105A is responsible for extracting information from the production data to create the index of shoppable items. The index of shoppable items includes the shoppable items used during the production of the visual media content 101C, and may represent all of the potential items for sale that are associated with the visual media content 101C.

At operation 403, user provided data indicating a desired shoppable item from the visual media content is received. The desired shoppable item represents either a visible item or a non-visible item. In an example embodiment, the user provided data is provided by the content consumer 103. The user provided data may be image data, audio data, or text data in various embodiments.

At operation 404, the desired shoppable item is identified with item recognition based on the user provided data and the index of shoppable items. In various embodiments, the recognition system 105B performs the item recognition. The items may be identified by object recognition, text recognition, or speech recognition, performed by recognition modules 1055, 1056, and 1057, respectively.

At operation 405, item information for the desired shoppable item is produced. In some embodiments, the marketplace system 142 produces the item information. In example embodiments, the item information may include listing information provided by the listing engine 164.

Figure 4B:
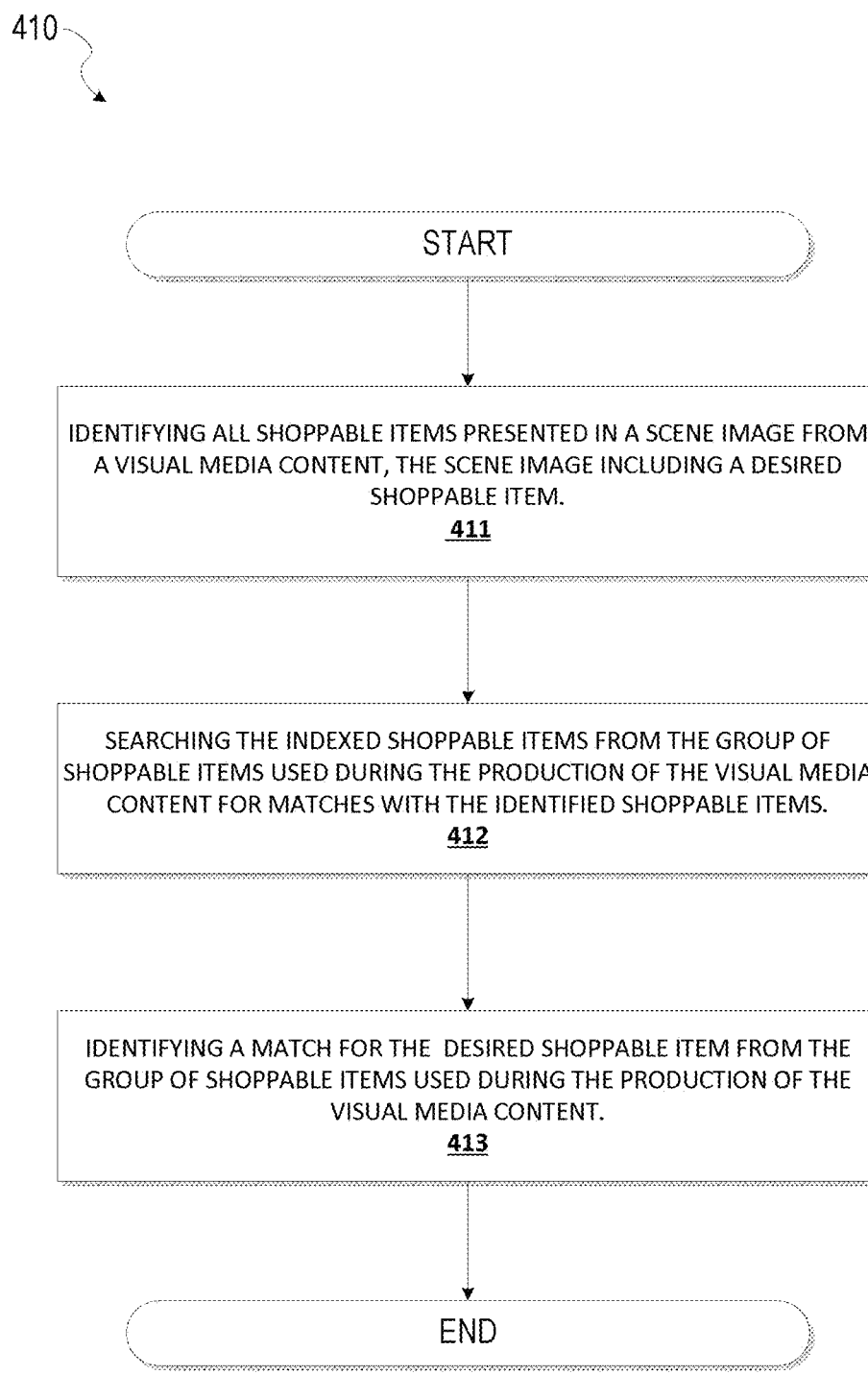
FIG. 4B is a flow diagram illustrating an example method for identifying desired shoppable items from a group of shoppable items using object recognition, according to various embodiments.

FIG. 4B is a flow diagram illustrating an example method for performing object recognition, according to one embodiment. The flow diagram 410 includes operations 411-413. The operations 411-413 may be performed by the recognition system 105B in example embodiments. At operation 411, all shoppable items presented in a scene image from a visual media content is identified. The scene image includes a desired shoppable item. At operation 412, the indexed shoppable items from the group of shoppable items used during the production of the visual media content is searched for matches with the identified shoppable items. At operation 413, a match is identified for the desired shoppable item from the group of shoppable items used during the production of the visual media content.

Figure 4C:
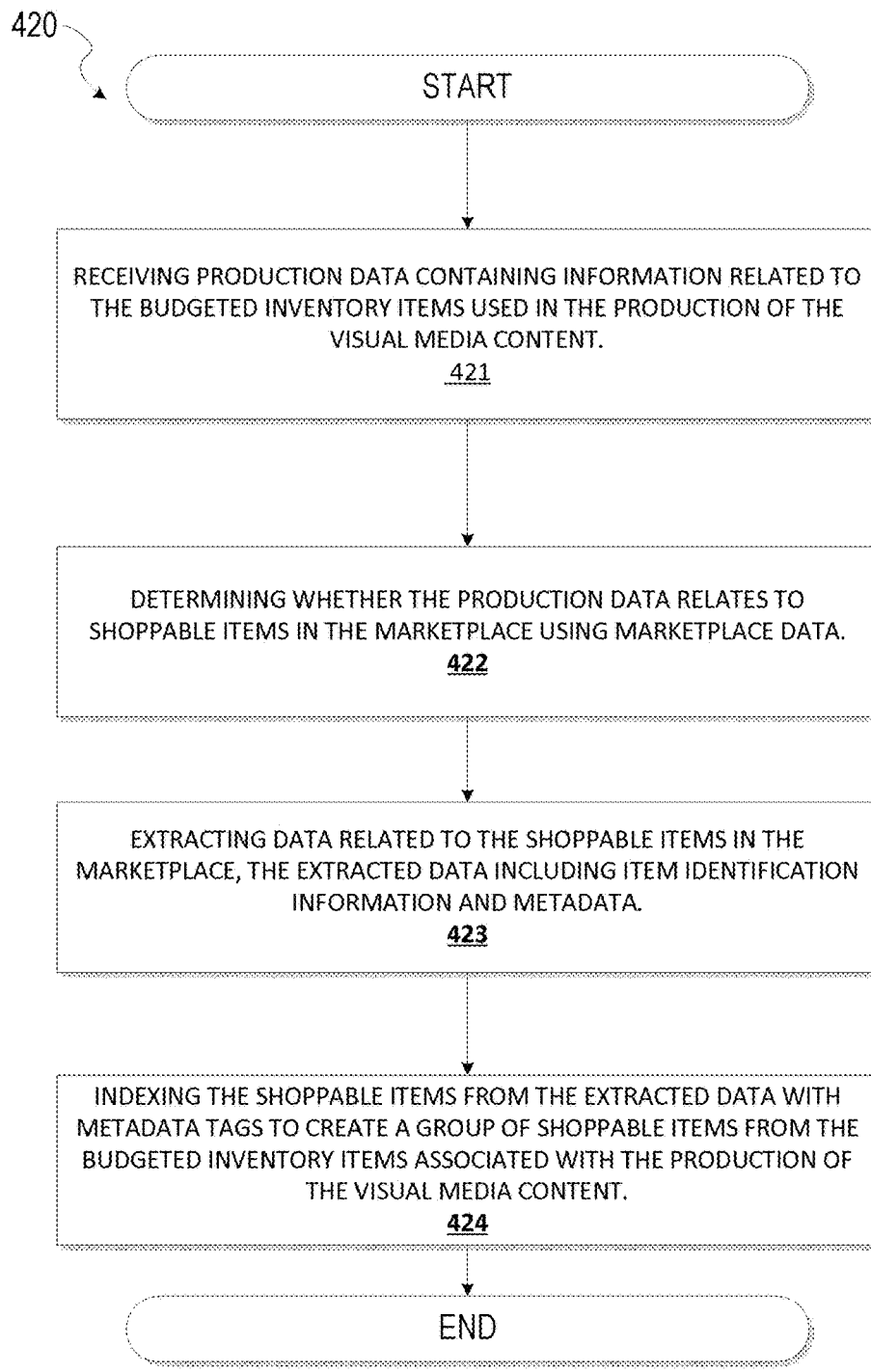
FIG. 4C is a flow diagram illustrating an example method for extracting information related to shoppable items from production data, according to various embodiments.

FIG. 4C is a flow diagram illustrating an example method for extracting data from the production data according to one embodiment. The flow diagram 420 includes operations 421-424. In example embodiments, the operations 421-424 may be performed by the indexing system 105A. At operation 421, production data containing information related to the budgeted inventory items used in the production of the visual media content is received. At operation 422, a determination is made using marketplace data as to whether the production data relates to shoppable items in the marketplace. At operation 423, data related to the shoppable items in the marketplace is extracted. The extracted data includes item identification information and metadata. At operation 424, the shoppable items from the extracted data are indexed with metadata tags to create a group of shoppable items from the budgeted inventory items. The budgeted inventory items are associated with the production of the visual media content.

Certain embodiments are described herein as including logic or a number of components, modules, or mechanisms. Modules may constitute either software modules (e.g., code embodied on a machine-readable medium or in a transmission signal) or hardware modules. In various embodiments, the modules described in FIGS. 1A-1E, are specially configured to perform the operations described in the specification. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors)

may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 5:
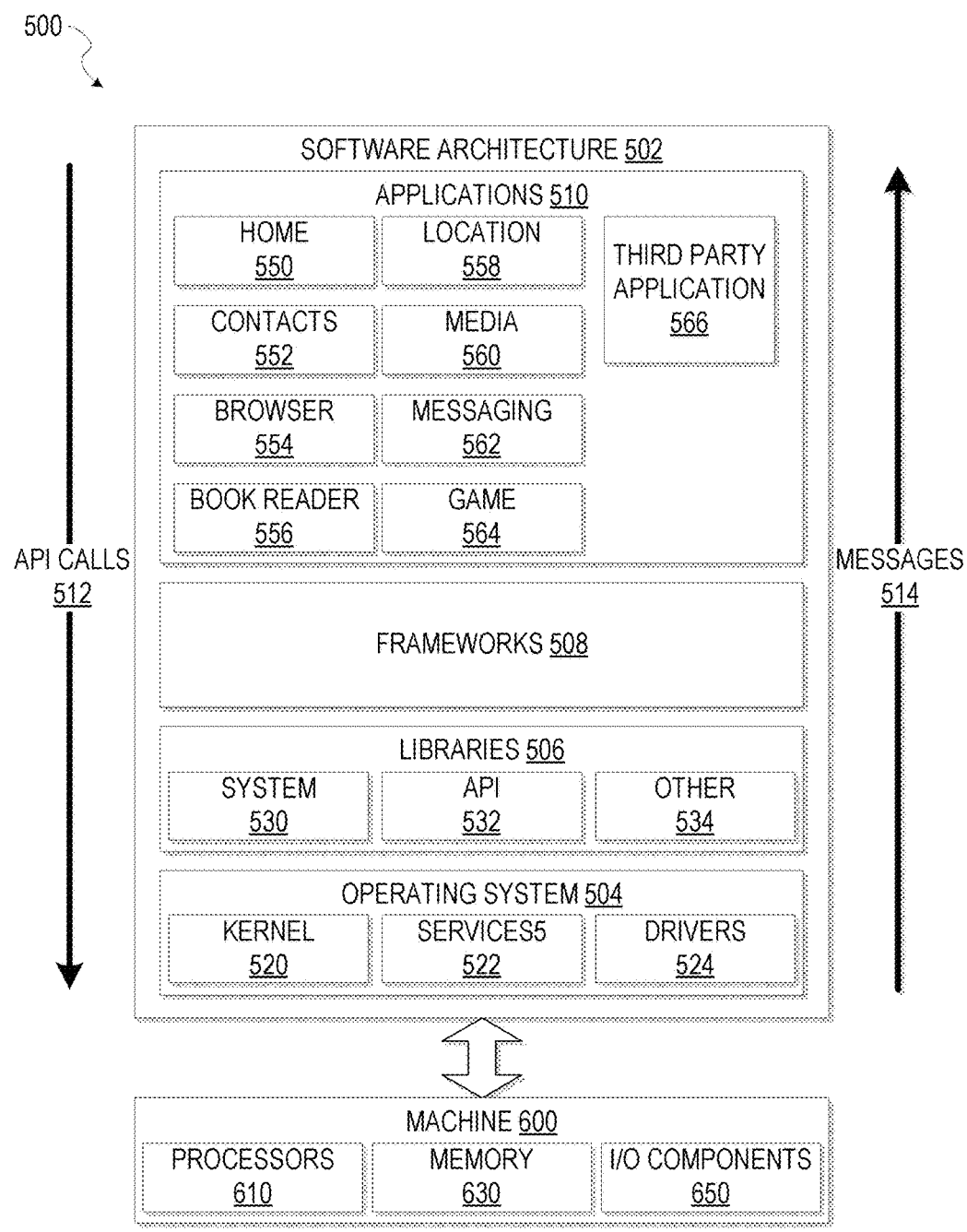
FIG. 5 is a block diagram illustrating an example of a software architecture that may be installed on a machine, according to some example embodiments.

FIG. 5 is a block diagram 500 illustrating architecture of software 502, which may be installed on any one or more of devices described above. FIG. 5 is merely a non-limiting example of a software architecture and it will be appreciated that many other architectures may be implemented to facilitate the functionality described herein. The software 502 may be executing on hardware such as machine 600 of FIG. 6 that includes processors 610, memory 630, and I/O components 650. In the example architecture of FIG. 5, the software 502 may be conceptualized as a stack of layers where each layer may provide particular functionality. For example, the software 502 may include layers such as an operating system 504, libraries 506, frameworks 508, and applications 510. Operationally, the applications 510 may invoke API calls 512 through the software stack and receive messages 514 in response to the API calls 512.

The operating system 504 may manage hardware resources and provide common services. The operating system 504 may include, for example, a kernel 520, services 522, and drivers 524. The kernel 520 may act as an abstraction layer between the hardware and the other software layers. For example, the kernel 520 may be responsible for memory management, processor management (e.g., scheduling), component management, networking, security settings, and so on. The services 522 may provide other common services for the other software layers. The drivers 524 may be responsible for controlling or interfacing with the underlying hardware. For instance, the drivers 524 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

The libraries 506 may provide a low-level common infrastructure that may be utilized by the applications 510. The libraries 506 may include system 530 libraries (e.g., C standard library) that may provide functions such as memory allocation functions, string manipulation functions, mathematic functions, and the like. In addition, the libraries 506 may include API libraries 532 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 506 may also include a wide variety of other libraries 534 to provide many other APIs to the applications 510.

The frameworks 508 may provide a high-level common infrastructure that may be utilized by the applications 510. For example, the frameworks 508 may provide various graphic user interface (GUI) functions, high-level resource management, high-level location services, and so forth. The frameworks 508 may provide a broad spectrum of other APIs that may be utilized by the applications 510, some of which may be specific to a particular operating system or platform.

The applications 510 include a home application 550, a contacts application 552, a browser application 554, a book reader application 556, a location application 558, a media application 560, a messaging application 562, a game application 564, and a broad assortment of other applications such as third party application 566. In a specific example, the third party application 566 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 566 may invoke the API calls 512 provided by the mobile operating system 504 to facilitate functionality described herein.

Figure 6:
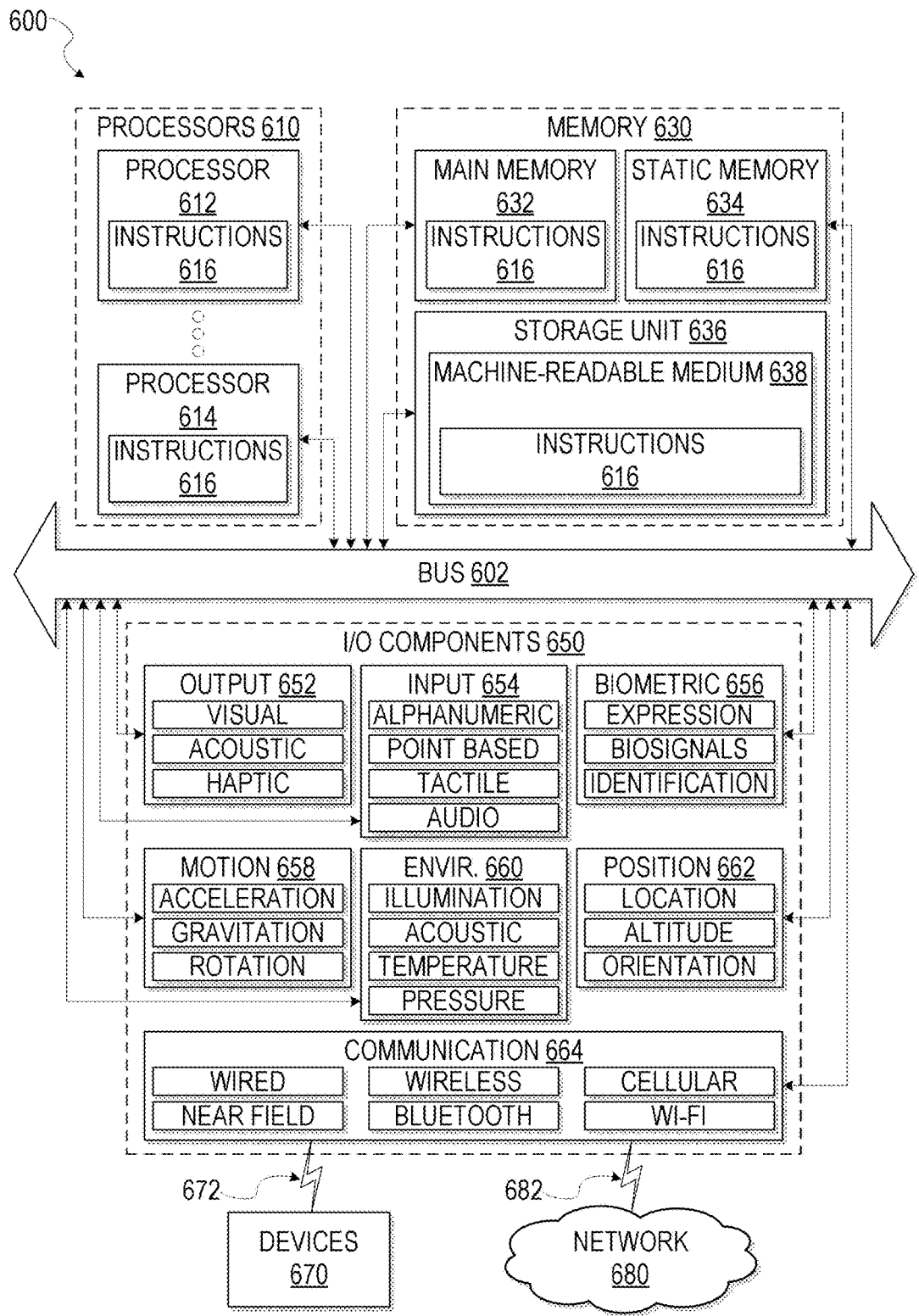
FIG. 6 illustrates a diagrammatic representation of a machine in the form of a computer system within which a set of instructions may be executed for causing the machine to perform any one or more of the methodologies discussed herein, according to an example embodiment.

FIG. 6 is a block diagram illustrating components of a machine 600, according to some example embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and input/output (I/O) components 650, which may be configured to communicate with each other via a bus 602. In an example embodiment, the processors 610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 612 and processor 614 that may execute instructions 616. The term "processor" is intended to include multi-core processor that may comprise two or more independent processors (also referred to as "cores") that may execute instructions contemporaneously. Although FIG. 6 shows multiple processors, the machine 600 may include a single processor with a single core, a single processor with multiple cores (e.g., a multi-core process), multiple processors with a single core, multiple processors with multiples cores, or any combination thereof.

The memory 630 may include a main memory 632, a static memory 634, and a storage unit 636 accessible to the processors 610 via a bus 602. The storage unit 636 may include a machine-readable medium 638 on which is stored the instructions 616 embodying any one or more of the methodologies or functions described herein. The instructions 616 may also reside, completely or at least partially, within the main memory 632, within the static memory 634, within at least one of the processors 610 (e.g., within the processor's cache memory), or any suitable combination thereof, during execution thereof by the machine 600. Accordingly, the main memory 632, static memory 634, and the processors 610 may be considered as machine-readable media 638.

As used herein, the term "memory" refers to a machine-readable medium 638 able to store data temporarily or permanently and may be taken to include, but not be limited to, random-access memory (RAM), read-only memory (ROM), buffer memory, flash memory, and cache memory. While the machine-readable medium 638 is shown in an example embodiment to be a single medium, the term "machine-readable medium" should be taken to include a single medium or multiple media (e.g., a centralized or distributed database, or associated caches and servers) able to store instructions 616. The term "machine-readable medium" shall also be taken to include any medium, or combination of multiple media, that is capable of storing instructions (e.g., instructions 616) for execution by a machine (e.g., machine 600), such that the instructions, when executed by one or more processors of the machine 600 (e.g., processors 610), cause the machine 600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 650 may include a wide variety of components to receive input, provide output, produce output, transmit information, exchange information, capture measurements, and so on. It will be appreciated that the I/O components 650 may include many other components that are not shown in FIG. 6. The I/O components 650 are grouped according to functionality merely for simplifying the following discussion and the grouping is in no way limiting. In various example embodiments, the I/O components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 654 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and force of touches or touch gestures, or other tactile input components), audio input components (e.g., a microphone), and the like.

In further example embodiments, the I/O components 650 may include biometric components 656, motion components 658, environmental components 660, or position components 662 among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 662 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via coupling 682 and coupling 672, respectively. For example, the communication components 664 may include a network interface component or other suitable device to interface with the network 680. In further examples, communication components 664 may include wired communication components, wireless communication components, cellular communication components, Near Field Communication (NFC) components, Bluetooth® components (e.g., Bluetooth® Low Energy), Wi-Fi® components, and other communication components to provide communication via other modalities.

The devices 670 may be another machine or any of a wide variety of peripheral devices (e.g., a peripheral device coupled via a USB).

Moreover, the communication components 664 may detect identifiers or include components operable to detect identifiers. For example, the communication components 664 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, reduced space symbology (RSS)-2D bar code, and other optical codes), or acoustic detection components (e.g., microphones to identify tagged audio signals). In addition, a variety of information may be derived via the communication components 664, such as, location via Internet Protocol (IP) geo-location, location via Wi-Fi® signal triangulation, location via detecting a NFC beacon signal that may indicate a particular location, and so forth.

In various example embodiments, one or more portions of the network 680 may be an ad hoc network, an intranet, an extranet, a VPN, a LAN, a WLAN, a WAN, a WWAN, a MAN, the Internet, a portion of the Internet, a portion of the PSTN, a POTS network, a cellular telephone network, a wireless network, a Wi-Fi® network, another type of network, or a combination of two or more such networks. For example, the network 680 or a portion of the network 680 may include a wireless or cellular network and the coupling 682 may be a Code Division Multiple Access (CDMA) connection, a Global System for Mobile communications (GSM) connection, or other type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., HyperText Transfer Protocol (HTTP)). Similarly, the instructions 616 may be transmitted or received using a transmission medium via the coupling 672 (e.g., a peer-to-peer coupling) to devices 670. The term "transmission medium" shall be taken to include any intangible medium that is capable of storing, encoding, or carrying instructions 616 for execution by the machine 600, and includes digital or analog communications signals or other intangible medium to facilitate communication of such software.

Furthermore, the machine-readable medium 638 is non-transitory (in other words, not having any transitory signals) in that it does not embody a propagating signal. However, labeling the machine-readable medium 638 as "non-transitory" should not be construed to mean that the medium is incapable of movement; the medium should be considered as being transportable from one physical location to another.

Additionally, since the machine-readable medium 638 is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    receiving at least one production document from a publisher of visual media content, the at least one production document containing information related to items in an inventory of items used in the production of the visual media content;
    extracting data, using a processor of a machine, from the at least one production document representing shoppable items to create an index of shoppable items associated with the visual media content, the index having metadata associated with the shoppable items;
    receiving user provided data indicating a selected shoppable item presented in the visual media content, the user provided data comprising audio content from the visual media content;
    identifying the selected shoppable item based on the user provided data and the index of shoppable items;
    producing item information for the selected shoppable item; and
    causing the presentation of the product item information in a user device.

2. The method of claim 1, wherein the identifying the selected shoppable item further comprises:
    matching the selected shoppable item with at least one of the shoppable items from the index of shoppable items representing a bounded group of inventory items used in the production of the visual media content.

3. The method of claim 1, wherein receiving the user provided data indicating the selected shoppable item presented in the visual media content further includes an image scene including the selected shoppable item; and wherein the selected shoppable item is visible in the image scene.

4. The method of claim 1, wherein the at least one production document includes an inventory of items included in a line producer's production budget of the visual media content.

5. The method of claim 1, wherein the selected shoppable item is not visible from the image scene.

6. The method of claim 5, further comprising identifying services provided in the production of the visual media content as the selected shoppable item.

7. The method of claim 1, wherein extracting data from the at least one production document comprises:
    performing object character recognition (OCR) on the at least one production document to extract key words; and
    identifying marketplace items from the extracted key words based on product information accessed from a marketplace system to generate extracted data.

8. The method of claim 7, further comprising:
    tagging the extracted data with metadata to create the index of shoppable items associated with the visual media content, the metadata including scene metadata to identify which scene the shoppable items are presented in the visual media content.

9. The method of claim 1,
    wherein receiving the user provided data indicating the selected shoppable item presented in the visual media content further comprises receiving a scene image including the shoppable item;
    wherein identifying the selected shoppable item in the scene further comprises performing object recognition on the scene image to identify all shoppable items in the scene image contained within the index of shoppable items.

10. The method of claim 1,
    wherein receiving the user provided data indicating the selected shoppable item presented in the visual media content further comprises receiving the user provided data identifying a service performed during the production of the visual media content.

11. The method of claim 1,
    wherein receiving the user provided data indicating the selected shoppable item presented in the visual media content further comprises receiving the user provided data related to a set design of the visual media content.

12. The method of claim 11, wherein the user provided data related to the set design of the visual media content includes sound information or lighting information.

13. The method of claim 1, wherein the user provided data relates to lines spoken by at least one cast member in the visual media content.

14. The method of claim 1, wherein the selected shoppable item comprises a non-visible item that relates to a smell, taste, or sound referenced in the visual media content.

15. A system, comprising:
at least one processor configured to perform operations for processor-implemented modules including:
a data extraction system configured to:
receive at least one of a production document from a publisher of a visual media content, the at least one production document containing information related to items in an inventory of items used in the production of the visual media content; and
extract data from the at least one production document related to the inventory items used in the production of the visual media content;
a metadata system configured to:
index the extracted data with metadata tags to create a group of shoppable items from the inventory items used in the production of the visual media content, the metadata tag representing metadata for visible shoppable items and non-visible shoppable items;
a recognition system configured to:
receive user provided data indicating a selected shoppable item presented in the visual media content, the user provided data comprising audio content from the visual media content, and
match the selected shoppable item with at least one of the shoppable items from the group of shoppable items; and
a marketplace system, configured to cause the presentation of item information for the matched at least one shoppable item from the group of shoppable items on a user device.

16. A non-transitory machine readable medium storing instructions that, when executed by at least one processor of a machine, cause the machine to perform operations comprising:
receiving at least one of a production document from a publisher of a visual media content, the at least one production document containing information related to items in an inventory of items used in the production of the visual media content;
extracting data from the at least one production document to create an index of shoppable items associated with the visual media content, the index having metadata associated with the shoppable items;
receiving user provided data indicating a selected shoppable item presented in the visual media content, the user provided data comprising audio content from the visual media content;
identifying the selected shoppable item based on the user provided data and the index of shoppable items;
producing item information for the selected shoppable item; and
causing the presentation of the item information in a user device.

17. The method of claim 1, the method further comprising identifying the selected shoppable item based on speech recognition performed on the audio content.

18. The method of claim 1, wherein the user provided data further comprises text entered by the user, the method further comprising identifying the selected shoppable item based in part on text recognition of the text entered by the user.

19. The machine readable medium of claim 16, wherein the data is extracted from the at least one production document by comparing the items from the at least one production document to marketplace data to identify items representing shoppable items.

* * * * *